US012469964B2

(12) United States Patent
Costa

(10) Patent No.: US 12,469,964 B2
(45) **Date of Patent: *Nov. 11, 2025**

(54) ANTENNA WITH LOW-COST STEERABLE SUBREFLECTOR

(71) Applicant: Viasat, Inc., Carlsbad, CA (US)

(72) Inventor: Luis Costa, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 18/300,216

(22) Filed: Apr. 13, 2023

(65) Prior Publication Data

US 2024/0021984 A1 Jan. 18, 2024

Related U.S. Application Data

(63) Continuation of application No. 17/793,646, filed as application No. PCT/US2020/015393 on Jan. 28, 2020, now Pat. No. 11,658,408.

(51) Int. Cl.

*H01Q 3/20* (2006.01)
*H01Q 1/12* (2006.01)
*H01Q 19/19* (2006.01)

(52) U.S. Cl.

CPC ................. *H01Q 3/20* (2013.01); *H01Q 1/12* (2013.01); *H01Q 19/19* (2013.01); *H01Q 19/192* (2013.01)

(58) Field of Classification Search

CPC ...... H01Q 1/12; H01Q 1/1207; H01Q 1/1228; H01Q 1/1242; H01Q 1/125; H01Q 1/1257;

(Continued)

(56) References Cited

U.S. PATENT DOCUMENTS

| | | | |
|---|---|---|---|
| 5,579,018 | A | 11/1996 | Francis et al. |
| 6,078,296 | A | 6/2000 | Wetter |

(Continued)

FOREIGN PATENT DOCUMENTS

| | | |
|---|---|---|
| CN | 1369931 | 1/2002 |
| CN | 107742775 | 10/2017 |

(Continued)

OTHER PUBLICATIONS

Notice of Allowance dated Jan. 24, 2023 in U.S. Appl. No. 17/793,646.

(Continued)

*Primary Examiner* — Robert Karacsony
(74) *Attorney, Agent, or Firm* — Snell & Wilmer L.L.P.

(57) ABSTRACT

Methods of antenna pointing and antenna assemblies implementing those methods are disclosed. An example method includes providing a user terminal antenna assembly including an antenna and an auto-peak device. The antenna includes a reflector, a subreflector, and a feed, the feed oriented relative to the reflector and the subreflector to produce a beam. The antenna further includes a tilt assembly to tilt the subreflector relative to the reflector and the feed. The method further includes providing a control signal to tilt the subreflector in a plurality of tilt positions to move the beam while measuring corresponding signal strength of a signal communicated via the antenna at each of the plurality of tilt positions. Additionally, the method includes selecting a tilt position from the plurality of tilt positions based on a measured signal strength, and providing the control signal to tilt the subreflector to the selected tilt position.

26 Claims, 18 Drawing Sheets

(58) Field of Classification Search
CPC ........ H01Q 1/1264; H01Q 1/18; H01Q 1/185; H01Q 3/005; H01Q 3/12; H01Q 3/16; H01Q 3/18; H01Q 3/20; H01Q 19/10; H01Q 19/18; H01Q 19/192; H01Q 19/191–195
See application file for complete search history.

(56) References Cited

U.S. PATENT DOCUMENTS

| | | | | |
|---|---|---|---|---|
| 11,658,408 | B2 * | 5/2023 | Costa | H01Q 1/1264 343/757 |
| 2008/0291102 | A1 | 11/2008 | Yun et al. | |
| 2015/0349417 | A1 | 12/2015 | Richards et al. | |
| 2017/0047653 | A1 | 2/2017 | Runyon et al. | |
| 2018/0375186 | A1 | 12/2018 | Sansone et al. | |

FOREIGN PATENT DOCUMENTS

| | | |
|---|---|---|
| CN | 107845856 | 12/2017 |
| DE | 4311111 | 12/1994 |
| EP | 2916386 | 9/2015 |
| GB | 2201293 | 8/1988 |
| JP | H11979919 | 4/1999 |
| WO | 2016/066395 | 5/2016 |

OTHER PUBLICATIONS

Jung et al., "Novel Antenna System Design for Satellite Mobile Multimedia Service", EEE Transactions on Vehicular Technology, vol. 59, No. 9 (2010).

International Search Report and Written Opinion dated Oct. 7, 2020 in PCT International Patent Application No. PCT/US2020/015393.

Written Opinion Dated Jun. 14, 2021 in PCT International Patent Application No. PCT/US2020/015393.

Notification Transmittal of the International Preliminary Report on Patentability dated May 20, 2020 in PCT International Patent Application No. PCT/US2020/015393.

Jung et al., "Novel Antenna System Design for Satellite Mobile Multimedia Service", IEEE Transactions on Vehicular Technology, vol. 59, No. 9 (2010).

* cited by examiner

ANTENNA WITH LOW-COST STEERABLE SUBREFLECTOR

CROSS-REFERENCE TO RELATED APPLICATIONS

This application is a continuation of U.S. application Ser. No. 17/793,646 filed Jul. 18, 2022, entitled "ANTENNA WITH LOW-COST STERRABLE SUBREFLECTOR". U.S. application Ser. No. 17/793,646 is a U.S. national stage entry under 35 U.S.C. § 371 of International Application No. PCT/US202/015393 filed Jan. 28, 2020, entitled "ANTENNA WITH LOW-COST STEERABLE SUBREFLECTOR". The foregoing applications are hereby incorporated by reference in their entirety (except for any subject matter disclaimers or disavowals, and except to the extent of any conflict with the disclosure of the present application, in which case the disclosure of the present application shall control).

FIELD OF INVENTION

The present disclosure relates generally to antennas, and more specifically to user terminal antenna assemblies that include a subreflector.

BACKGROUND

A user terminal antenna assembly is typically aligned to a target upon deployment to the location where the antenna is to be used. As part of the installation process, an installer may attach a support structure of the antenna to an object (e.g., ground, a building or other structure, or other objects capable of supporting an antenna) and carry out a pointing process to point the beam of the antenna towards a target antenna (e.g., on a geostationary satellite). The pointing process may include loosening bolts on a mounting bracket on the back of the antenna and physically moving the antenna until sufficiently pointed at the target. The installer may tune the pointing by using a signal metric (e.g., signal strength) of a signal communicated between the antenna and the target. Once sufficiently pointed, the installer may tighten the bolts to immobilize the mounting bracket.

Although the antenna may be considered "sufficiently" pointed, the gain of the beam in the direction of the target antenna may be less than the boresight direction of the maximum gain of the beam. This may, for example, be due to manual pointing accuracy limitations, due to a relatively low requirement for considering when the pointing is sufficient in order to account for location-dependent signal metric variation, or due to both manual pointing accuracy limitations and a relatively low requirement for considering when the pointing is sufficient. In addition, once sufficiently pointed, the direction of the beam of the antenna may shift slightly as the installer locks down the mounting bracket. Furthermore, the antenna may remain in service for a long time after installation. Over this time period, several influences can cause the antenna to move and thus change the direction of the beam. For example, the mounting bracket may slip, the object on which the antenna is mounted can shift slightly, the antenna may be struck by an object (e.g., a ball striking the antenna), or other factors may cause movement of the boresight direction of the antenna over time.

The misalignment between the boresight direction of the beam of the antenna and the direction of the target antenna may cause pointing errors that can have a significant detrimental effect on the quality of the link between the antenna and the target. For example, a small misalignment may be compensated for by reducing a modulation and a coding rate of signals communicated between the antenna and the target. However, to maintain a given data rate, e.g., bits-per-second (bps), reducing a modulation and a coding rate of signals communicated between the antenna and the target may increase system resource usage and thus result in inefficient use of the resources. In addition, after installation, it may be difficult to determine whether performance degradation is due to misalignment of the antenna or some other cause. Diagnosing degraded performance may require dispatching a truck to the location of the antenna so a technician can determine the cause and attempt to correct it, which increases costs for managing the system.

SUMMARY

In an example embodiment, a method of antenna pointing includes providing a user terminal antenna assembly. The antenna assembly used in the method of antenna pointing may include an antenna and an auto-peak device. The antenna may include a reflector, a subreflector coupled to the reflector via a support boom, and a feed and a transceiver assembly on the support boom. The feed may be oriented relative to the reflector and the subreflector to produce a beam. The antenna may further include a tilt assembly to tilt the subreflector relative to the reflector and the feed to move the beam in a pattern in response to a control signal provided from the auto-peak device. Additionally, the method may include providing, by the auto-peak device, the control signal to the tilt assembly to tilt the subreflector in a plurality of tilt positions relative to the reflector to move the beam. The method includes measuring a corresponding signal strength of a signal communicated via the antenna at each of the plurality of tilt positions. The method also includes selecting, by the auto-peak device, a tilt position from the plurality of tilt positions based on the measured signal strength. Additionally, the method includes providing, by the auto-peak device, the control signal to tilt the subreflector to the selected tilt position.

In an example embodiment, an antenna assembly includes a support boom, a reflector coupled to a first end of the support boom, a subreflector, a feed and a transceiver assembly attached to the support boom, the feed oriented relative to the subreflector and the reflector to produce a user terminal beam, a tilt assembly coupled to a second end of the support boom opposite the first end, the tilt assembly further coupled to the subreflector to tilt the subreflector, relative to the reflector and the feed, to move the user terminal beam in response to a control signal, and an auto-peak device. The auto peak device may provide the control signal to tilt the subreflector in a plurality of tilt positions to move the user terminal beam. The auto peak device may measure corresponding signal strength of a signal communicated via the antenna assembly at each of the plurality of tilt positions. The auto peak device may select a tilt position from the plurality of tilt positions based on the measured signal strength and provide the control signal to tilt the subreflector to the selected tilt position.

BRIEF DESCRIPTION OF THE DRAWING FIGURES

Additional aspects of the present invention will become evident upon reviewing the non-limiting embodiments described in the specification and the claims taken in conjunction with the accompanying figures, wherein like numerals designate like elements, and:

DETAILED DESCRIPTION

Figure 1:
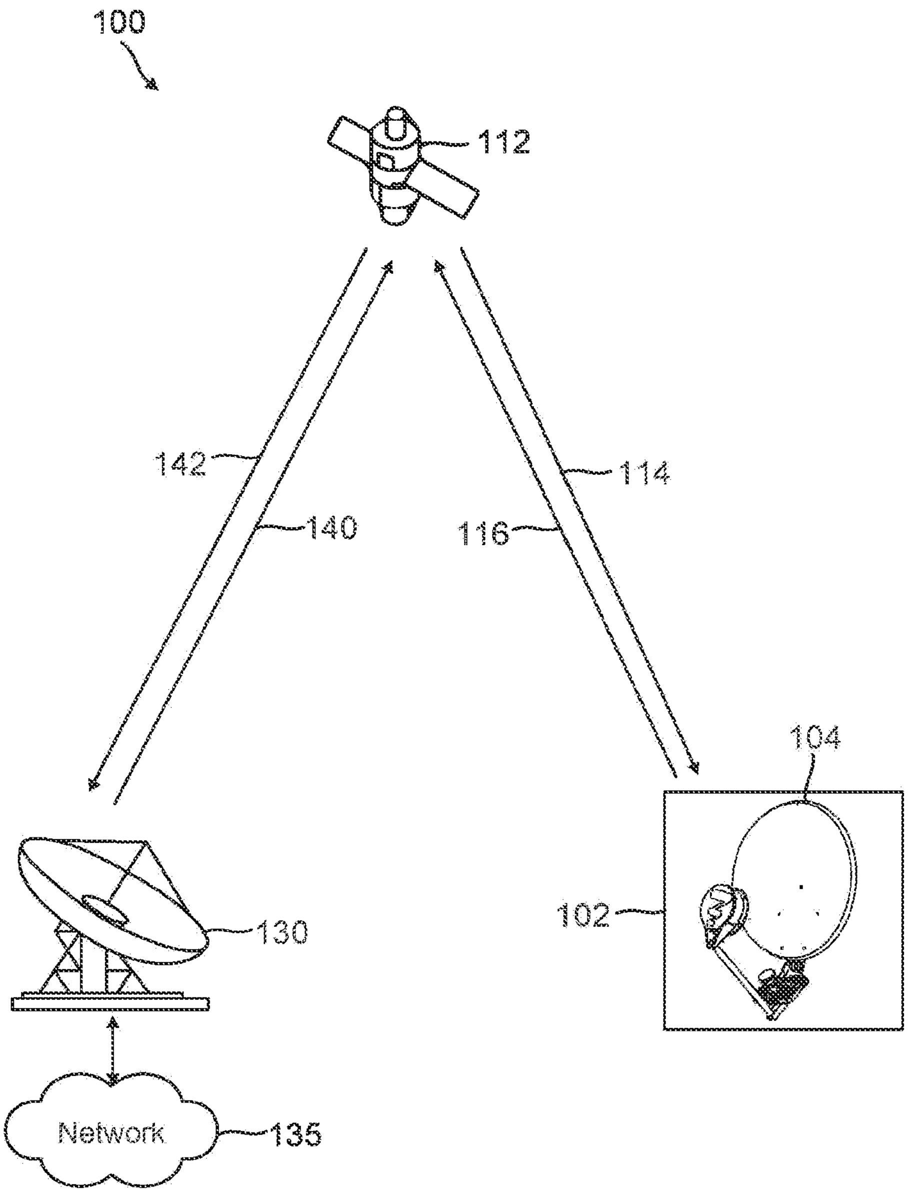
FIG. 1 is a diagram illustrating an example two-way satellite communications system in which an antenna assembly as described herein can be used.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

An antenna assembly as described herein may provide very accurate alignment of an antenna with a target (e.g., a target antenna on a geostationary satellite or other communication device) at installation, as well as correct misalignments that may occur over time. The antenna assembly may provide self-peaking capability during installation, as well as permit self-re-alignment and remote re-alignment over time. As described in more detail below, the antenna assembly may include a tilt assembly capable of moving a beam of the antenna by making small tilt adjustments to a subreflector.

The methods, systems and devices described herein may reduce the operational cost of installation and maintenance for antennas (e.g., satellite antennas or other antennas) and improve resource efficiency of communication systems using such antennas. For example, achieving and maintaining accurate alignment between the antenna and a target may reduce the necessary system resources for maintaining a given data rate by increasing the allowable coding rate (e.g., decreasing data redundancy), which may increase overall system performance. In addition, by remotely re-aligning the antenna or self-re-aligning the antenna over time, technician service calls may be avoided, and performance degradation issues may be resolved more quickly, which may improve the customer experience and reduce the impact of degraded performance on the overall system.

In an example embodiment, a user terminal antenna assembly comprises: a support boom, a reflector coupled to a first end of the support boom, a subreflector, a feed and a transceiver assembly attached to the support boom, the feed oriented relative to the subreflector and the reflector to produce a user terminal beam, and a tilt assembly coupled to a second end of the support boom opposite the first end, the tilt assembly further coupled to the subreflector to tilt the subreflector, relative to the reflector and the feed, to move the user terminal beam in response to a control signal. The user terminal antenna assembly further comprises an auto-peak device to: provide the control signal to tilt the subreflector in a plurality of tilt positions to move the user terminal beam while measuring corresponding signal strength of a signal communicated via the antenna assembly at each of the plurality of tilt positions, to select a tilt position from the plurality of tilt positions based on the measured signal strength, and provide the control signal to tilt the subreflector to the selected tilt position.

FIG. 1 is a diagram illustrating an example two-way satellite communication system 100 in which an antenna assembly 104 (not to scale) as described herein can be used. In an example embodiment, antenna assembly 104 is a user terminal antenna assembly. Many other configurations are possible having more or fewer components than the two-way satellite communication system 100. Although examples described herein use a satellite communications system for illustrative purposes, the antenna assembly 104 and techniques described herein are not limited to such satellite communication embodiments. For example, the antenna assembly 104 and techniques described herein could be used for point-to-point terrestrial links and may not be limited to two-way communication. In one example embodiment, consumer residential satellite "dish" for satellite internet may be provided over the antenna assembly 104. In another example embodiment, the antenna assembly 104 may be used for a receive-only implementation, such as for receiving satellite broadcast television.

The antenna assembly 104 may, for example, be attached to a structure, such as the roof or side wall of a house. As described in more detail below, the antenna assembly 104 includes a tilt assembly that may provide very accurate alignment of an antenna of the antenna assembly 104 with a target at installation, as well as correct misalignments that may occur over time. Example targets include but are not limited to a target antenna on a geostationary satellite 112, a target antenna on a point-to-point terrestrial link, or other antennas on other communication systems.

In the illustrated embodiment, the antenna assembly 104 is part of a fixed user terminal 102, e.g., which may include a modem, an antenna, such as a dual reflector antenna, and a transceiver. The fixed user terminal 102 may also include memory for storage of data and software applications, a processor for accessing data and executing applications, and components that facilitate communication over the two-way satellite communication system 100, e.g., such as a modem or other components. Although only one fixed user terminal 102 is illustrated in FIG. 1 to avoid over complication of the drawing, the two-way satellite communication system 100 may include many fixed user terminals 102.

In the illustrated embodiment, satellite 112 provides bidirectional communication between the fixed user terminal 102 and a gateway terminal 130. The gateway terminal 130 is sometimes referred to as a hub or ground station. The gateway terminal 130 includes an antenna to transmit a forward uplink signal 140 to the satellite 112 and to receive a return downlink signal 142 from the satellite 112. The gateway terminal 130 may also schedule traffic to the fixed user terminal 102. Alternatively, the scheduling may be performed in other elements of the two-way satellite communication system 100 (e.g., a core node, network operations center (NOC), or other components, not shown). Signals 140, 142 communicated between gateway terminal 130 and satellite 112 may use the same, overlapping or different frequencies as signals 114, 116 communicated between satellite 112 and fixed user terminal 102. Gateway terminal 130 may be located remotely from fixed user terminal 102 to enable frequency reuse. By separating the gateway terminal 130 and the fixed user terminal 102, spot beams with common frequency bands can be geographically separated to avoid interference.

A network 135 may be interfaced with the gateway terminal 130. The network 135 may be any type of network and can include, for example, the Internet, an Internet Protocol (IP) network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network, any other type of network supporting communication between devices as described herein, or any combination of these. The network 135 may include both wired and wireless connections as well as optical links. The network 135 may connect multiple gateway terminals 130 that may be in communication with satellite 112 and/or with other satellites.

The gateway terminal 130 may be provided as an interface between the network 135 and the satellite 112. The gateway terminal 130 may be configured to receive data and information directed to the fixed user terminal 102. The gateway terminal 130 may format the data and information and transmit the forward uplink signal 140 to the satellite 112 for delivery to the fixed user terminal 102. Similarly, the gateway terminal 130 may be configured to receive return downlink signal 142 from the satellite 112 (e.g., containing data and information originating from the fixed user terminal 102) that is directed to a destination accessible via the network 135. The gateway terminal 130 may also format the received return downlink signal 142 for transmission on the network 135.

The satellite 112 receives the forward uplink signal 140 from the gateway terminal 130 and transmits the corresponding forward downlink signal 114 to the fixed user terminal 102. Similarly, the satellite 112 receives the return uplink signal 116 from the fixed user terminal 102 and transmits the corresponding return downlink signal 142 to the gateway terminal 130. The satellite 112 may operate in a multiple spot beam mode, transmitting and receiving several narrow beams directed to different regions on Earth. This allows for segregation of fixed user terminals 102 into various narrow beams. Alternatively, the satellite 112 may operate in wide area coverage beam mode, transmitting one or more wide area coverage beams.

The satellite 112 may be configured as a "bent pipe" satellite that performs frequency and polarization conversion of the received signals before retransmission of the signals to their destination. As another example, the satellite 112 may be configured as a regenerative satellite that demodulates and re-modulates the received signals before retransmission.

The antenna assembly 104 includes an antenna that produces a beam pointed at the satellite 112 to facilitate communication between the fixed user terminal 102 and satellite 112. In the illustrated embodiment, the fixed user terminal 102 includes a transceiver (not shown) to transmit to and receive signals from satellite 112. In the illustrated embodiments described below, the user terminal antenna assembly 104 includes a reflector, a subreflector, a feed, a transceiver assembly, a tilt assembly, and an auto-peak device. Accordingly, the reflector, the subreflector, and the feed may cooperate to produce the beam pointed at the satellite 112 to provide for transmission of the return uplink signal 116 and reception of the forward downlink signal 114. Alternatively, the antenna of the antenna assembly 104 may be any other type of antenna that may use a subreflector. In these example embodiments, the user terminal antenna assembly 104 is configured to tilt the subreflector in an automated manner to tune the pointing of the beam for the user terminal antenna assembly.

Figure 2:
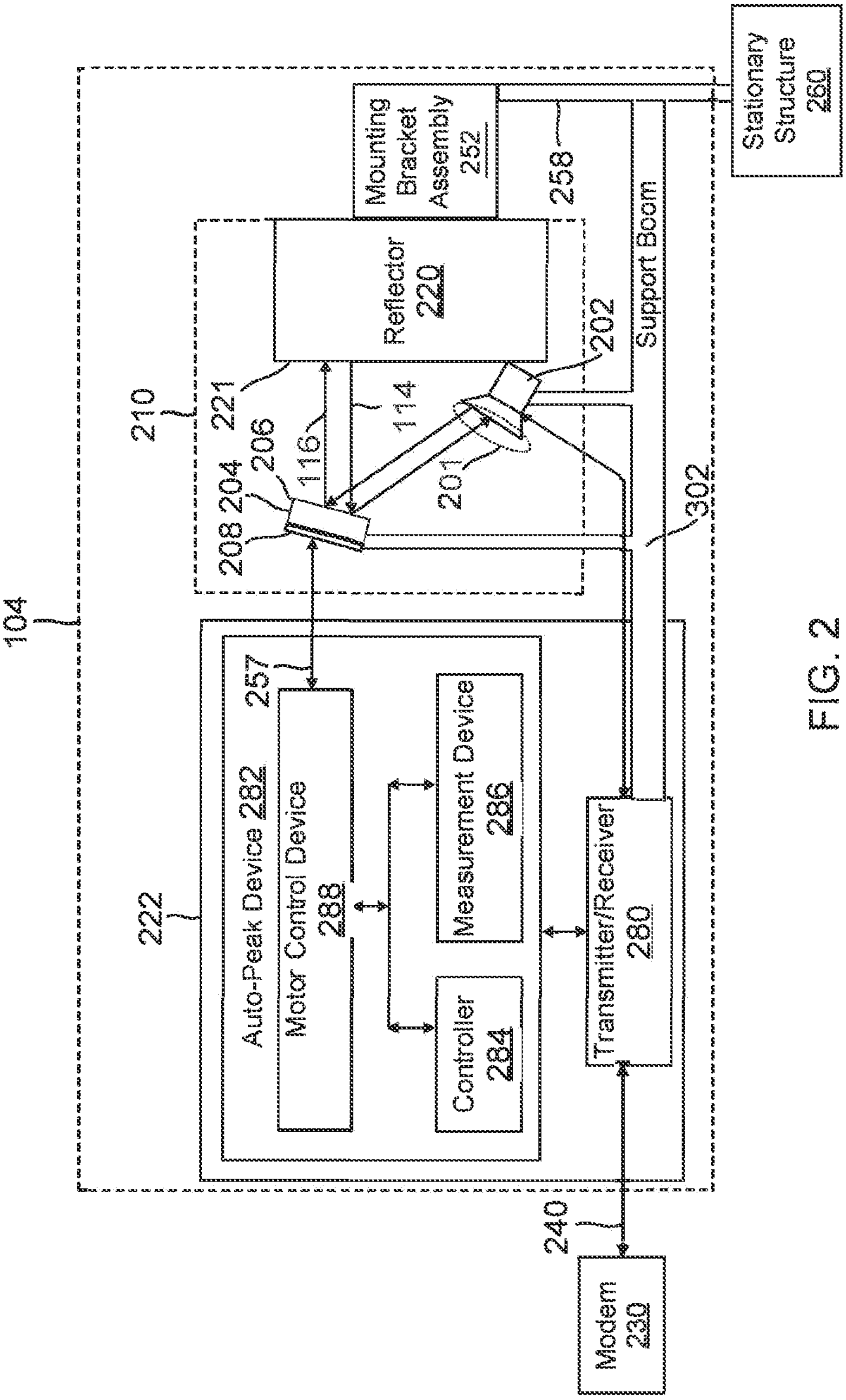
FIG. 2 is a block diagram illustrating an example of the fixed user terminal of FIG. 1.
Figure 3:
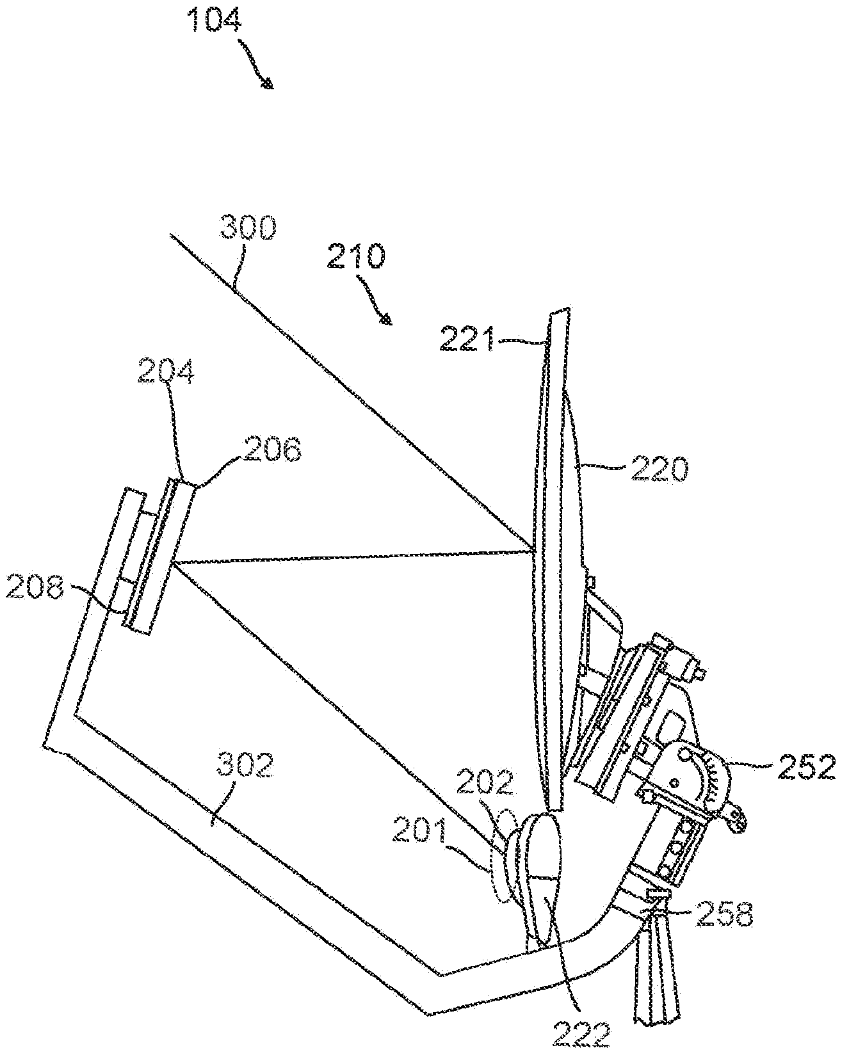
FIG. 3 is a diagram illustrating a side view of an example antenna assembly.

FIG. 2 is a block diagram illustrating an example of the fixed user terminal 102 of FIG. 1, and FIG. 3 is a diagram illustrating a side view of an example antenna assembly 104. Many other configurations are possible having more or fewer components than the fixed user terminal 102 illustrated in FIG. 2 and FIG. 3. Moreover, the functionalities described herein can be distributed among the components in a different manner than described herein.

With reference now to FIGS. 2 and 3, the antenna assembly 104 includes an antenna 210. In the illustrated embodiment, the antenna 210 is a reflector antenna that includes a reflector 220, a subreflector 204 and a feed 202 that illuminates the subreflector 204. Reflector 220 may further comprise a reflector surface 221. The reflector surface 221 may include one or more electrically conductive materials that reflect electromagnetic energy. The subreflector 204 may have a subreflector surface 206, e.g., one or more electrically conductive materials that reflect electromagnetic energy. In the illustrated embodiment, the feed 202 illuminates the reflector surface 221 by way of the subreflector 204. In an example embodiment, the antenna 210 is an offset-fed dual-reflector antenna.

The shape of the reflector surface 221 and the shape of the subreflector surface 206 in combination with each other are designed to define a focal region 201. The feed 202 may be within the focal region 201 to illuminate the subreflector surface 206 of the subreflector 204, which, in turn, may illuminate the reflector surface 221 to produce a beam pointed towards the satellite 112 of FIG. 1. The reflector surface 221 and/or the subreflector surface 206 may vary from embodiment to embodiment. For example, a convex subreflector surface 206 may be used. Accordingly, in one example embodiment, a Gregorian focus characterization may be used. In another example embodiment, a Cassegrain focus characterization may be used. In other examples, other currently known or later developed focus characterizations may be used. The focal region 201 may be a three-dimensional volume within which the reflector surface 221 causes electromagnetic energy to converge sufficiently to permit signal communication having desired performance characteristics when an incident plane wave arrives from the direction of the satellite 112. Reciprocally, the reflector surface 221 of the reflector 220 and the subreflector surface 206 of the subreflector 204 are angled and positioned relative to each other to reflect electromagnetic energy originating from the feed 202 at a location within the focal region 201 such that the reflected electromagnetic energy adds constructively in the direction of the satellite 112 sufficient to permit signal communication having desired performance characteristics, while partially or completely cancelling out electromagnetic energy in all other directions. Thus, the reflector surface 221 and the subreflector surface 206 are angled and positioned relative to each other to reflect electromagnetic energy originating from the feed 202 to form a beam comprising the peak of the final antenna pattern.

In an example embodiment, the feed 202 illuminates the subreflector surface 206. In turn, the reflector surface 221 is illuminated by a beam reflected by the subreflector surface 206 to produce a beam that may provide for transmission of the return uplink signal 116. Conversely, a beam of the forward downlink signal 114 may be reflected by reflector surface 221 to the subreflector surface 206. The subreflector surface 206 may reflect the beam to the feed 202, which may provide for reception of the forward downlink signal 114 from the satellite 112. That is, the forward downlink signal 114 from the satellite 112 is focused by the reflector surface 221, then subreflector surface 206, and then received by the feed 202 that is positioned within the focal region 201. Similarly, the return uplink signal 116 from the feed is reflected by the reflector surfaces 206, 221 to focus the return uplink signal 116 in the direction of the satellite 112.

The feed 202 may, for example, be a waveguide-type feed structure including a horn antenna and may include dielectric inserts. Alternatively, other types of structures and feed elements may be used. As mentioned above, in an example embodiment, the antenna 210 is an offset-fed dual-reflector antenna. Therefore, the feed 202 is offset from the subreflector 204 and reflector 220. This is in contrast to the configuration of the gateway terminal 130, that typically uses a subreflector to reflect a signal to a focal point at a center of a large reflector.

The feed 202 communicates the return uplink signal 116 and the forward downlink signal 114 with a transceiver assembly 222 to provide for bidirectional communication with the satellite 112. In the illustrated embodiment, the transceiver assembly 222 is located on the antenna assembly 104. Alternatively, the transceiver assembly 222, or various components thereof, may be in a different location(s) that is (are) not on the antenna assembly 104.

In this illustrated example embodiment, the transceiver assembly 222 includes a receiver within transmitter/receiver 280 that can amplify and then downconvert the forward downlink signal 114 from the feed to generate an intermediate frequency (IF) receive signal for delivery to a modem 230. Similarly, the transceiver assembly 222 includes a transmitter within transmitter/receiver 280 that can upconvert and then amplify an IF transmit signal received from the modem 230 to generate the return uplink signal 116 for delivery to the feed 202. In some embodiments, in which the satellite 112 operates in a multiple spot beam mode, the frequency ranges and/or the polarizations of the return uplink signal 116 and the forward downlink signal 114 may be different for the various spot beams. Thus, the transceiver assembly 222 may be within the coverage area of one or more spot beams and may be configurable to match the polarization and the frequency range of a particular spot beam. The modem 230 may, for example, be located inside the structure to which the antenna assembly 104 is attached. As another example, the modem 230 may be located on the antenna assembly 104, such as being incorporated within the transceiver assembly 222.

In the illustrated embodiment, the transceiver assembly 222 communicates the IF receive signal and IF transmit signal with modem 230 via IF/DC cabling 240 that may also be used to provide DC power to the transceiver assembly 222. Alternatively, the transceiver assembly 222 and the modem 230 may, for example, communicate the IF transmit signal and IF receive signal wirelessly.

The modem 230 may respectively modulate and demodulate the RF receive and transmit signals to communicate data with a router (not shown). The router may, for example, route the data among one or more end user devices (not shown), such as laptop computers, tablets, mobile phones, or other end user devices, to provide bidirectional data communications, such as two-way Internet, telephone service or some combination of two-way Internet and telephone service.

In an example embodiment, antenna assembly 104 further includes a support such as a support pier 258. Support pier 258 may be configured to support the user terminal antenna assembly. In an example embodiment, the support pier 258 is attached on one end to a stationary structure 260 (e.g., ground, a building or other structure, etc.). In another example embodiment, the support pier 258 is attached on one end to a vehicle, such as a recreational vehicle (RV). In these example embodiments, support pier 258 may be configured to support the reflector 220, feed 202, transceiver assembly 222, and subreflector 204. For example, support pier 258 may support these components via a support boom 302, and the reflector 220 specifically via a mounting bracket assembly 252. Furthermore, in an example embodiment, the support boom supports the subreflector 204 via a tilt assembly 208. Using the techniques described herein, the subreflector may be pointed to position the beam, e.g., based on received signal strength.

In the illustrated embodiment, reflector 220 is connected to support pier 258 by a mounting bracket assembly 252. In another embodiment, the reflector 220 may be attached to the support boom 302 and the mounting bracket assembly 252 may be connected between the support boom and the support pier. In an example embodiment, the mounting bracket assembly 252, may be used to coarsely point the beam of the antenna 210 at the satellite 112. Generally, the orientation of the subreflector 204 may be used to fine tune the pointing of the beam.

In some embodiments described herein, the angular displacement of the beam provided by adjustments to the angle of the subreflector 204 may be less than the angular displacement of the beam provided by the mounting bracket assembly 252. For example, in some embodiments, the mounting bracket assembly 252 may provide adjustments of the beam over a range of elevation angles and a range of azimuth angles (e.g., a full 90 degrees in elevation, and a full 360 degrees in azimuth), while adjustments to the angle of the subreflector 204 may provide adjustment over less than those ranges (e.g., 4 degrees in elevation, and 4 degrees in azimuth).

The mounting bracket assembly 252 may be of a conventional design and can include azimuth, elevation and skew adjustments of the antenna assembly 104 relative to the support pier 258. Elevation refers to the angle between the centerline of the reflector 220 and the horizon, e.g., the angle between the centerline of the reflector 220 and an idealized horizon. Azimuth refers to the angle between the centerline of the reflector 220 and the direction of true north in a horizontal plane. Skew refers to the angle of rotation about the centerline.

The mounting bracket assembly 252 may, for example, include bolts that can be loosened to permit the antenna assembly 104 to be moved in azimuth, elevation and skew. After positioning the antenna assembly 104 to the desired position in one of azimuth, elevation and skew, the bolts for that portion of the mounting bracket assembly 252 can be tightened and other bolts loosened to permit a second adjustment to be made.

As described in more detail below, an installer may use the mounting bracket assembly 252 to coarsely point the beam of the antenna 210 in a direction generally towards the satellite 112 (or other target). The coarse pointing may have a pointing error (e.g., due to manual pointing accuracy limitations), which may result in the gain of the beam in the direction of the satellite 112 being less than the boresight direction of maximum gain of the beam. For example, the direction of the target of the satellite 112 may be within the 1 dB beamwidth of the beam.

The installer may use a variety of techniques to coarsely point the beam of the antenna 210 at the satellite 112. For example, initial azimuth, elevation and skew angles for pointing the beam of the antenna 210 may be determined by the installer based on the known location of the satellite 112 and the known geographic location where the antenna assembly 104 is being installed. In embodiments in which the reflector surface 221 is not symmetric about the boresight axis and correspondingly has major and minor beamwidth values in two planes, the installer can adjust the skew angle of the mounting bracket assembly 252 until the major axis of the reflector surface 221 (the longest line through the center of the reflector 220) is aligned with the geostationary arc.

Once the beam of the antenna 210 has been initially pointed in the general direction of the satellite 112, the elevation and/or azimuth angles can be further adjusted by the installer until the beam of the antenna 210 is sufficiently coarsely pointed at the satellite 112. The techniques for determining when the beam of the antenna 210 is sufficiently coarsely pointed at the satellite 112 can vary from embodiment to embodiment.

In some embodiments, the beam of the antenna 210 may be coarsely pointed using signal strength of a signal received from the satellite 112 via the feed 202, such as the forward downlink signal 114. In other embodiments, the beam of the antenna 210 may also or alternatively be coarsely pointed using information in the received signal indicating the signal strength of a signal received by the satellite 112 from the antenna 210, such as the return uplink signal 116. Other metrics and techniques may also or alternatively be used to coarsely point the beam of the antenna 210.

In embodiments in which the received signal strength is used, a measurement device, such as a power meter, may be used to directly measure the signal strength of the received signal. Alternatively, a measurement device may be used to measure some other metric indicating signal quality of the received signal. The measurement device may, for example, be an external device that the installer temporarily attaches to the feed 202. As another example, the measurement device may be incorporated into the transceiver assembly 222, such as measurement device 286 of auto-peak device 282 (discussed in more detail below). In such a case, the measurement device may, for example, produce audible tones indicating signal strength to assist the installer in pointing the beam of the antenna 210.

The installer can then iteratively adjust the elevation and/or azimuth angle of the mounting bracket assembly 252 until the received signal strength (or other metric), as measured by the measurement device, reaches a predetermined value. In some embodiments, the installer adjusts the mounting bracket assembly 252 in an attempt to maximize the received signal strength. Alternatively, other techniques may be used to determine when the beam of the antenna 210 is sufficiently coarsely pointed.

Once the beam is sufficiently coarsely pointed in the direction of the satellite 112, the installer can immobilize the mounting bracket assembly 252 to preclude further movement of the beam by the mounting bracket assembly 252. As described in more detail below, the installer can then use the tilt assembly 208 to fine tune the pointing of the beam of the antenna 210 to more accurately point the boresight direction beam in the direction of the satellite 112 (i.e., reduce the pointing error). In some aspects, adjustments to the tilt of the subreflector 204 may be used to double check the accuracy of the installer's installation, e.g., when the mounting bracket assembly 252 is used by the installer for coarse alignment during the installation.

In the illustrated embodiment, an auto-peak device 282 may perform an automated process to perform the fine pointing of the beam by tilting the subreflector 204 with a tilt assembly 208. The tilt assembly 208 may comprise actuators to tilt the subreflector. In one example embodiment, the actuators are motors. In various embodiments, the auto-peak device 282 may be within the transceiver assembly 222 or part of another device, or a separate component. In FIG. 2, the auto-peak device 282 includes controller 284, measurement device 286, and motor control device 288. Many other configurations are possible having more or fewer components than the auto-peak device 282 shown in FIG. 2. Moreover, the functionalities described herein can be distributed among the components in a different manner than described herein. In an example embodiment, the auto-peak device 282 may be configured to periodically provide the control signal 257 to the tilt assembly 208 to tilt the subreflector 204 in the plurality of tilt positions and periodically select the tilt position.

The controller 284 may control operation of the measurement device 286 and the motor control device 288 to perform the fine pointing operation of the beam, tilting the subreflector 204 using the techniques described herein. The functions of the controller 284 can be implemented in hardware, instructions embodied in memory and formatted to be executed by one or more general or application specific processors, firmware, or any combination thereof.

The controller 284 can be responsive to a received command to begin the fine pointing operation of the beam of the antenna 210. The command may, for example, be transmitted to the fixed user terminal 102 by the gateway terminal 130 (or other elements of the two-way satellite communication system 100 such as a core node, NOC, etc.) via the forward downlink signal 114 upon completion of the coarse pointing operation. For example, the command may be transmitted via the forward downlink signal 114 upon initial entry of the fixed user terminal 102 into the network. In other embodiments, the command may be received from equipment (e.g., a cell phone, laptop) carried by the installer. In such a case, the installer may indicate successful completion of the coarse pointing operation via input on an interface on the equipment, which results in the equipment then transmitting the command to the controller 284 to initiate the fine pointing operation. In yet other embodiments, the installer equipment may communicate successful completion of the coarse pointing operation to gateway terminal 130 (or elements of the two-way satellite communication system 100, such as a core node, NOC, etc.) which, in turn, then transmits the command to the controller 284 to begin the fine pointing operation. During the fine pointing operation, the motor control device 288 can provide motor control signals 257 to the motors in the tilt assembly 208. For example, the motor control device 288 within the auto-peak device 282 may be configured to provide the control signal 257 to the tilt assembly 208 to tilt the subreflector 204 in a plurality of tilt positions and select the tilt position to verify an installation of the antenna assembly 104. The motors, or more generally, actuators, are described in more detail below.

The measurement device 286 may be used to measure the received signal strength at the various tilt positions of the subreflector 204. In some embodiments, the measurement device 286 is a power meter. Upon moving the direction of the beam along a pattern, the controller 284 can then select the final tilt position of the subreflector 204, and thus the final direction to point the beam of the antenna 210, based on the measured signal strength (e.g., the tilt position corresponding to the maximum measured signal strength). The controller 284 can then command the motor control device 288 to provide the motor control signals 257 to one or more of the motors in the tilt assembly 208 to drive the subreflector 204 to the selected tilt position. Alternatively, other techniques may be used to determine the final tilt position of the subreflector 204. For example, in some embodiments, the beam of the antenna 210 may also or alternatively be finely pointed using information in the received signal indicating the signal strength of a signal received by the satellite 112 from the antenna 210, such as the return uplink signal 116.

In an example embodiment, the beam may be moved in a spiral or other pattern to determine a preferred beam angle for the antenna assembly. For example, a spiral search, a step-size search, a grid search, or other searches may be performed. In doing so, the beam may be scanned in two dimensions (e.g., azimuth and elevation), e.g., along a series of positions in the two dimensions to form the search pattern. As a result, the tilt assembly may provide two-dimensional beam scanning.

In some embodiments, prior to commanding the motor control device 288 to tilt the subreflector 204 to the selected tilt position, the controller 284 may compare the selected tilt position to the overall range of adjustment over which the subreflector 204 is capable of moving. For example, the controller 284 may determine whether the selected tilt position is less than a threshold amount from the end of the overall range of adjustments associated with the subreflector 204. In other words, the controller 284 may determine whether the selected tilt position is too near the outer edge of the tilt assembly's/subreflector's range of motion. When the selected tilt position is greater than the threshold amount from the end of the overall range of adjustment (e.g., sufficiently close to the center of the spiral pattern), the subreflector 204 may be considered to have sufficient angular displacement after installation to permit remote re-alignment over time. In such a case, the controller 284 can then command the motor control device 288 to drive the subreflector 204 to the selected tilt position. However, when the selected tilt position is less than the threshold amount from the end of the overall range of adjustment, the controller 284 may cause the installer to be notified that another coarse pointing operation of the beam of the antenna 210 is required. The manner in which the controller 284 notifies the installer can vary from embodiment to embodiment. For example, the controller 284 may notify the installer by commanding the measurement device 286 to produce an audible tone indicating that another coarse pointing operation is required. As another example, in embodiments in which the installer carries equipment (e.g., a cell phone, laptop, etc.), the controller 284 may transmit a command to the installer equipment indicating that another coarse pointing operation is required. In other example embodiments, a notification can be sent to the customer by email or electronically so that the customer is aware of a potential issue with, e.g., the satellite Internet service due to a possible lack of pointing accuracy. In another example embodiment, a notification may be sent by email or electronically to a service provider or other organization to dispatch a truck for coarse pointing due to being at an end or an edge of the overall range of subreflector movement.

In embodiments described above, the auto-peak device 282 is used to fine tune the pointing of the beam of the antenna 210 during installation of the antenna assembly 104. In some embodiments, the auto-peak device 282 may also or alternatively be used for fine tune pointing of the beam of the antenna 210 from time to time after the installation. In particular, once the user terminal antenna assembly 104 has been installed and is in use, the auto-peak device 282 can permit fine tuning the pointing of the beam from time to time without requiring a technician or other person to be present at the installation location of the fixed user terminal 102. The auto-peak device 282 may, for example, automatically perform the fine tune pointing process by tilting the subreflector 204. In an example embodiment, the auto-peak device 282 may be further configured to transmit an alert when the selected tilt position is at a predetermined maximum angle from a neutral tilt position of the subreflector 204. In some embodiments, the auto-peak device 282 may be external to the antenna assembly 104. For example, the auto-peak device may be external test equipment in an example embodiment.

In some embodiments, the auto-peak device 282 may perform the fine tune pointing process in response to detection of performance degradation that could be caused by a change in the direction of the beam. The manner in which the performance degradation is detected and the auto-peak device 282 initiates the fine pointing operation can vary from embodiment to embodiment. In some embodiments, the auto-peak device 282 may include memory for storing the measured signal strength made by the measurement device 286 during installation and compare that stored measured signal strength to a current measurement made by the measurement device 286. The auto-peak device 282 may then initiate the fine tune pointing operation if the difference between the current measured signal strength and the stored measured signal strength exceeds a threshold.

In some embodiments, the gateway terminal 130 (or other elements of the two-way satellite communication system 100, such as a core node, NOC, etc.) may monitor operation of the fixed user terminal 102 remotely and transmit a command to the auto-peak device 282 via the forward downlink signal 114 upon detection of possible performance degradation that could be caused by a change in the direction of the beam. This command may be configured to cause controller 284 to fine tune the pointing of the subreflector 204.

If the performance degradation is not corrected following the fine pointing operation, it may be the case that the performance degradation is not due to mis-pointing, and a technician service call may be scheduled so that a technician can determine the cause. In some embodiments, the gateway terminal 130 or other elements of the two-way satellite communication system 100 may transmit the command from time to time to ensure the beam of the antenna 210 remains pointed accurately at the satellite 112, regardless of whether performance degradation has been detected.

Example embodiments of the systems and methods described herein may include a double reflector configuration, e.g., including a reflector 220 and a subreflector 204. Generally, the subreflector 204 may be smaller than the reflector 220. The subreflector 204 may be mechanically steered to adjust for small misalignments of the antenna 210. Manual pointing of the antenna 210 may lead to an antenna 210 that is not aimed accurately enough at the satellite to provide adequate signal reception from a satellite or adequate signal transmission to the satellite. Accordingly, an antenna 210 that is not aimed accurately enough at the satellite may decrease the overall capacity of the network. In an example embodiment, the deployment of auto-peaking and auto-pointing terminals may improve antenna pointing to help alleviate issues related to poor antenna pointing and help to maximize the capacity of the network and, hence, increase competitiveness of systems implementing the systems and methods described herein compared to other communication systems.

In the illustrated embodiment, and with continued reference to FIGS. 2 and 3, feed 202 is attached to support boom 302 at a position near an edge of the reflector 220. Stated another way, the feed 202 may be one of: directly attached to support boom 302, on the support boom 302, directly coupled to the support boom 302, attached to the support boom 302 with no major intermediate components, or otherwise directly supported by the support boom 302. The subreflector 204 is attached to the support boom 302 opposite the feed 202. As illustrated in FIG. 3, in an example embodiment, the support boom 302 is a single support boom 302. As illustrated in FIG. 3, the single support boom 302 may be "below", along-side, or otherwise outside the diameter of the reflector 220. Thus, in an example embodiment, the single support boom is not attached to the surface of the reflector 220. Moreover, the subreflector is supported in a cantilevered manner by the support boom 302. The single support boom 302 may thus provide a cantilevered connection between the steerable subreflector 204 and the reflector 220. In contrast, an antenna at a gateway terminal 130 generally uses a reflector on a three-point mount to reflect a signal to a focal point (and an associated feed) at a center of a large reflector rather than a cantilevered offset mount. Moreover, in the gateway terminal 130, in contrast, the three point mounts connect to the surface of the main reflector.

As a result of the position of the feed 202 relative to the subreflector 204 and the reflector 220, the feed 202 illuminates the reflector 220 (via the subreflector 204) to produce a beam having a boresight direction along line 300. As discussed above, the mounting bracket assembly 252 can be used to coarsely point the beam in the general direction of the satellite 112. The tilt assembly 208 can then be used for fine tune pointing of the beam at the satellite 112 such that the direction of the satellite is substantially aligned with the boresight direction of the beam along line 300. The tilt assembly 208 is configured to tilt the subreflector 204 relative to the reflector 220 and the feed 202 to move the beam (e.g., line 300) in response to a control signal 257 indicative of the measured signal strength (e.g., of signal 114). In an example embodiment, moving the beam may include moving the beam in both elevation and azimuth directions.

In an example embodiment, the support boom 302 comprises an extruded element, such as an extruded metal, extruded plastic, and the like. Moreover the support boom 302 could be made of any other suitable material such as metal, plastic, or the like and can be formed using any suitable manufacturing technique such as casting, injection molding, 3D printing, and the like.

Figure 4:
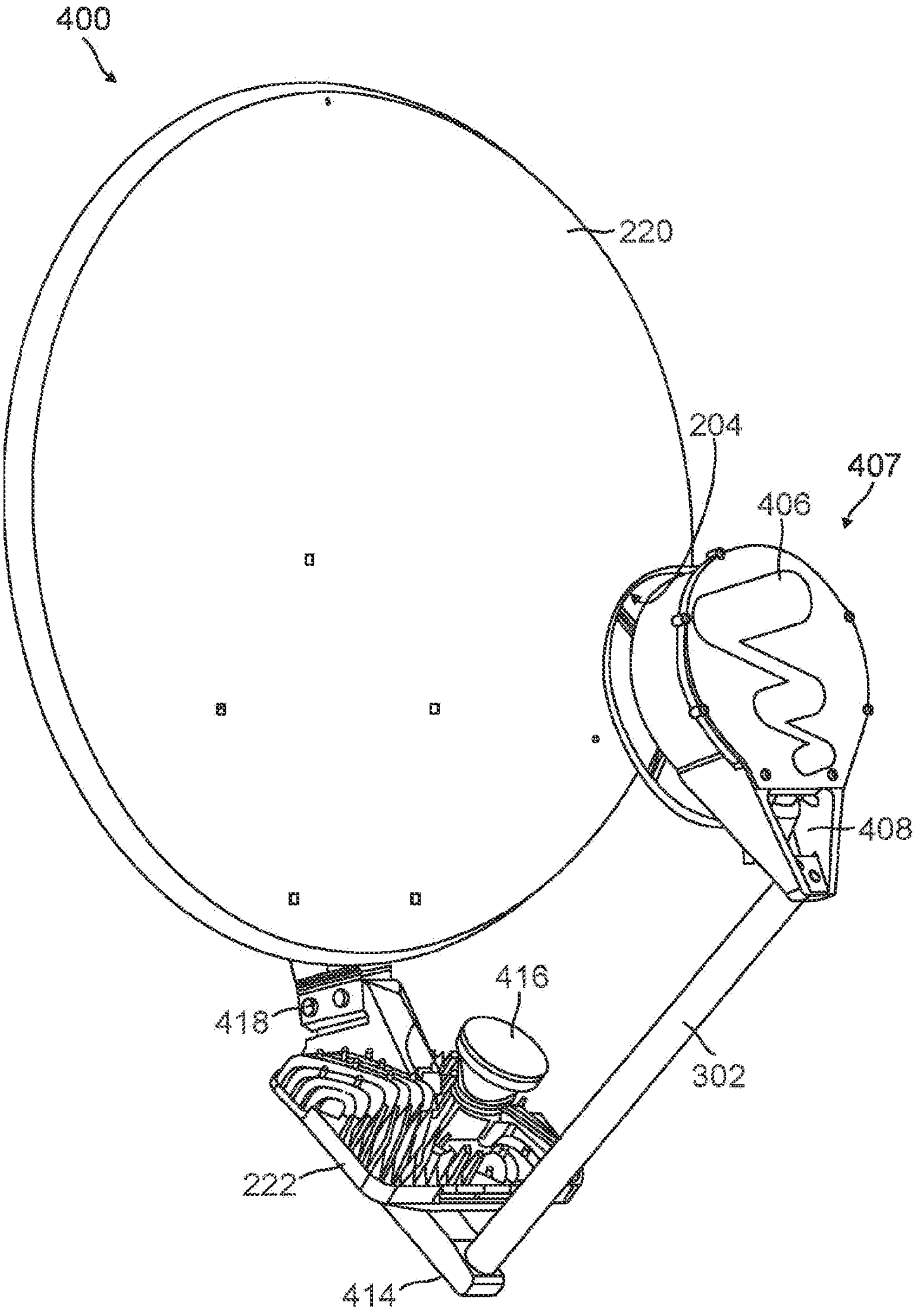
FIG. 4 is a diagram illustrating an example user terminal antenna assembly with a steerable subreflector.

FIG. 4 is a diagram illustrating an example user terminal antenna assembly 400 with a steerable subreflector 204. The user terminal antenna assembly 400 comprises a reflector 220, the subreflector 204, a tilt assembly 407, a single support boom 302, a receiver, transmitter, or transceiver (e.g., pTRIA) (e.g., transceiver assembly 222), a support 414 for the receiver, transmitter, or transceiver, a feed 416 (comprising, for example, a feed chain horn and lens), and a back-plate assembly 418. The support 414, in an example embodiment, is connected between a first end of the single support boom 302 and the back-plate assembly 418, and supports the transceiver assembly 222. In another example embodiment, the support 414 forms part of the single support boom 302, which is connected at its first end to the back-plate assembly 418. In an example embodiment, the back-plate assembly connects to the back side of the reflector 220.

In an example embodiment, the tilt assembly 407 is coupled to a second end of the support boom opposite the first end. The tilt assembly 407 is further coupled to the subreflector to tilt the subreflector 204, relative to the reflector 220 and the feed 416, to move the user terminal beam in response to a control signal. In an example embodiment, the tilt assembly 407 further comprises a base structure 408 and an enclosure lid 406 forming an enclosure. In some examples, however, the base structure 408, with or without the enclosure lid 406 may not form an enclosure. For example, the base structure 408 may not be sealed. Rather, in some example embodiments, the base structure 408 may be a frame on which various other components are attached.

The example user terminal antenna assembly 400 may generally be a self-pointing antenna. In an example embodiment, after a coarse aiming, the user terminal antenna assembly 400 is configured to change pointing direction by some number of degrees, e.g., 4° or more in some embodiments (or fewer in other example embodiments). Accordingly, the user terminal antenna assembly 400 may be able to check on the accuracy of an installation or the accuracy of a re-pointing, correct for errors in pointing of the user terminal antenna assembly 400 during the installation or the re-pointing of the user terminal antenna assembly 400, check for and potentially correct for changes in pointing accuracy over time, or some combination of these.

The example user terminal antenna assembly 400 may generally be used for fixed user terminal 102 of FIG. 1. For example, the user terminal antenna assembly 400 may generally be used in the fixed user terminal 102 to provide for reception of signals 114 (FIG. 1), transmission of signals 116 (FIG. 1), or reception and transmission of signals 114, 116.

As described herein, the example user terminal antenna assembly 400 may be configured to include a method for self-alignment and auto-peeking the terminal main beam. In an example embodiment, the user terminal antenna assembly is configured to steer the beam in both azimuth and elevation. As described herein, this beam steering movement may be based on tilting the subreflector 204. In various example embodiments, the steering movement may have a precision of ±0.035°, or ±$\frac{1}{75}$° (±0.0133°); however, example embodiments having greater or lesser precision are also contemplated. As described herein, movement may be provided by two actuators (e.g., linear motors). In an example embodiment, the movement of the actuators may be transformed into angular movement of the subreflector. More specifically, in an example embodiment, for each actuator, movement of one actuator is configured to tilt the beam in both the azimuth and elevation directions. Thus, the linear movement of one actuator is divided between azimuth tilt and elevation tilt, providing for greater step size resolution in the movement of the subreflector.

FIGS. 5-9 are diagrams illustrating various aspects of an example steerable subreflector assembly 500 that may form a part of the user terminal antenna assembly 400 of FIG. 4. The examples of FIGS. 5-9 introduce various components of the example steerable subreflector assembly 500.

Figure 5:
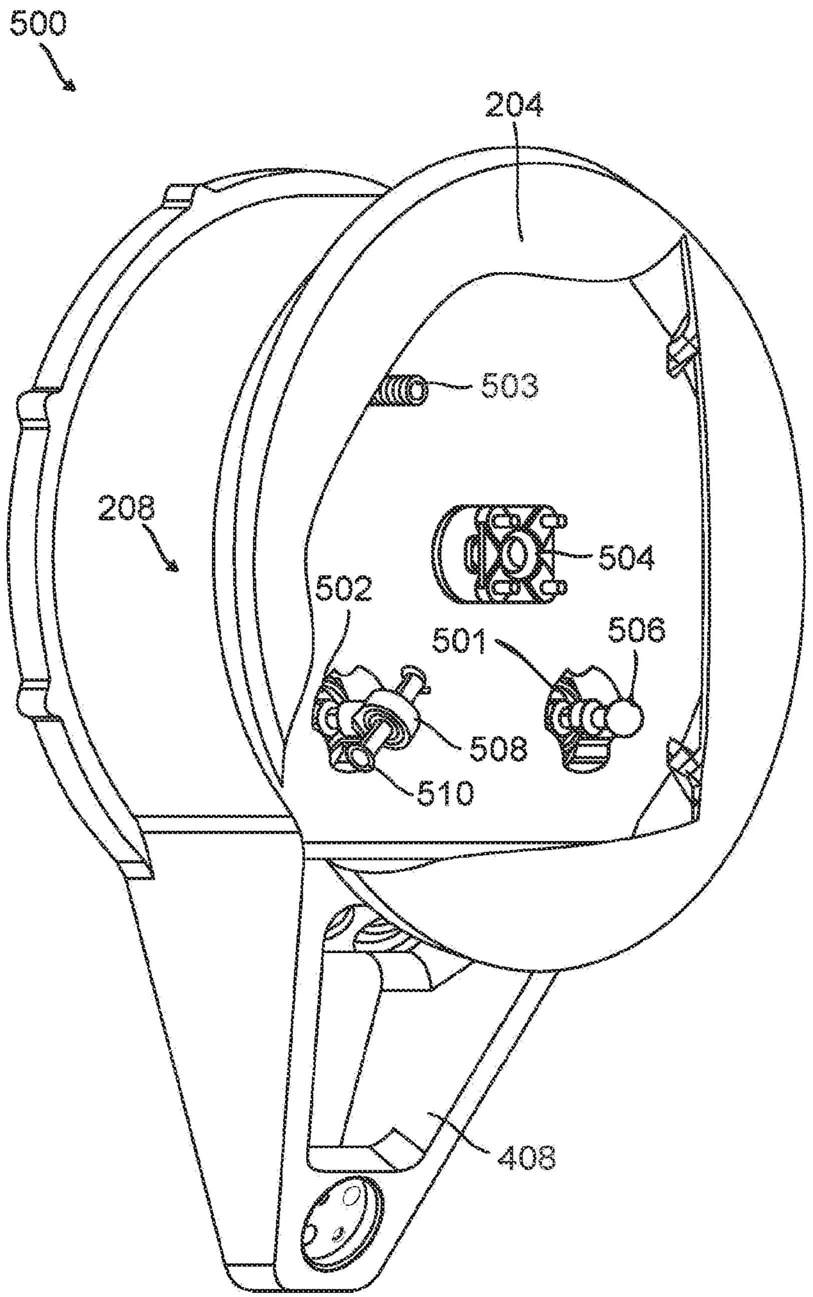
FIG. 5 is a diagram illustrating an example steerable subreflector having two actuators, that may be used with the antenna of FIG. 4.

FIG. 5 is a diagram illustrating an example steerable subreflector having two actuators, and that may be used with the antenna of FIG. 4. The example steerable subreflector assembly 500 includes the subreflector 204 and the tilt assembly 208. FIG. 5 provides a close up view of the subreflector 204 and tilt assembly 208 with a cut-away view through the subreflector to illustrate various components (501, 502, 503, 504, 506, 508, 510) of the tilt assembly 208. In an example embodiment, the base structure 408 together with the enclosure lid 406 (not shown in FIG. 5) may form an enclosure for at least partially containing the various components. The tilt assembly 208 further comprises a first actuator 501, a second actuator 502, a spring 503, and a central pivot assembly 504.

The central pivot assembly 504 may be connected to the structure of the tilt assembly. In one example embodiment, the tilt assembly is connected to the base structure 408. Thus, the various components may be mounted to the base structure 408 of the tilt assembly and may extend to attach to the subreflector. Moreover, the central pivot assembly comprises any suitable connection for tilting the subreflector about the central pivot facilitating tilting the subreflector in both azimuth and elevation directions. In an example embodiment, the central pivot comprises a ball joint or any suitable kinematic joint.

In an example embodiment, the first and second actuators 501/502 are linear actuators. Each actuator 501/502 may be attached to the base structure 408, which may be a "ceiling" of an enclosure. In one example embodiment, each actuator 501/502 may attach to an interior side of the base structure 408 and extend through the base structure 408 to contact a back side of the subreflector 204. Each linear actuator may be configured to move the subreflector about the central pivot.

In an example embodiment, a linear movement of the first actuator in a direction colinear with a first attachment point of the first actuator on the subreflector may cause a first tilt of the subreflector about the central pivot. The axis of rotation may be perpendicular to the direction colinear with the first attachment point. Furthermore, linear movement of the second actuator in a direction colinear with a second attachment point of the second actuator on the subreflector may cause a second tilt of the subreflector about the central pivot. The axis of rotation may be perpendicular to the direction colinear with the second attachment point, with the first tilt and the second tilt perpendicular to each other.

In an example embodiment, the first actuator 501 and the second actuator 502 each comprise a motor. The motors may be stepper motors, for example. Although described herein as motors, any suitable actuator 601, 602 for moving the subreflector 204 may be used, e.g., hydraulic actuators, pistons, servos, worm gears, a rack and pinion, worm gears and a spur gear, linear actuators, or the like.

The tilt assembly may further comprise spring 503 to dampen play within the tilt assembly, e.g., to reduce backlash or to keep the actuators in contact with the subreflector. In an example embodiment, the spring 503 may be located on the side of the central pivot opposite of the first actuator and along a line running through the central pivot and the first actuator. In one example embodiment, the spring 503 is connected to the base structure 408 to contact the backside of subreflector 204. In another example embodiment, the spring 503 is mounted to the surface of the tilt assembly and extends to contact the backside of subreflector 204. In either case, the spring assembly comprises any suitable counterforce device to maintain a force on the backside of subreflector 204. Although described herein as a spring, the force may be created by any suitable counter-force device. For example, the counter-force device may comprise a hydraulic piston, a rubber band, a bungy cord, or any other type of counter-force device.

In one example embodiment, the first and second actuators may be coupled to the subreflector through any suitable type of joint or contact. For example, the contact may be a point contact, a ball and socket contact, or a spherical rod end connection, as described in more detail herein. In an example embodiment illustrated in FIG. 5, the first actuator 501 has a spherical adapter connection 506. The spherical adapter connection facilitates a point contact with the backside of subreflector 204, or can facilitate a ball and socket contact with the backside of subreflector 204. The second actuator 502 may be coupled to the subreflector 204 through a spherical rod end connection 508. In another example embodiment, both the first actuator and the second actuator are coupled to the subreflector through corresponding spherical adapter connections. In yet another example embodiment, both the first actuator and the second actuator are coupled to the subreflector through corresponding spherical rod end connections. In an example embodiment the spherical rod end connection 508 rotates on a shaft 510 as described further below.

Figure 6:
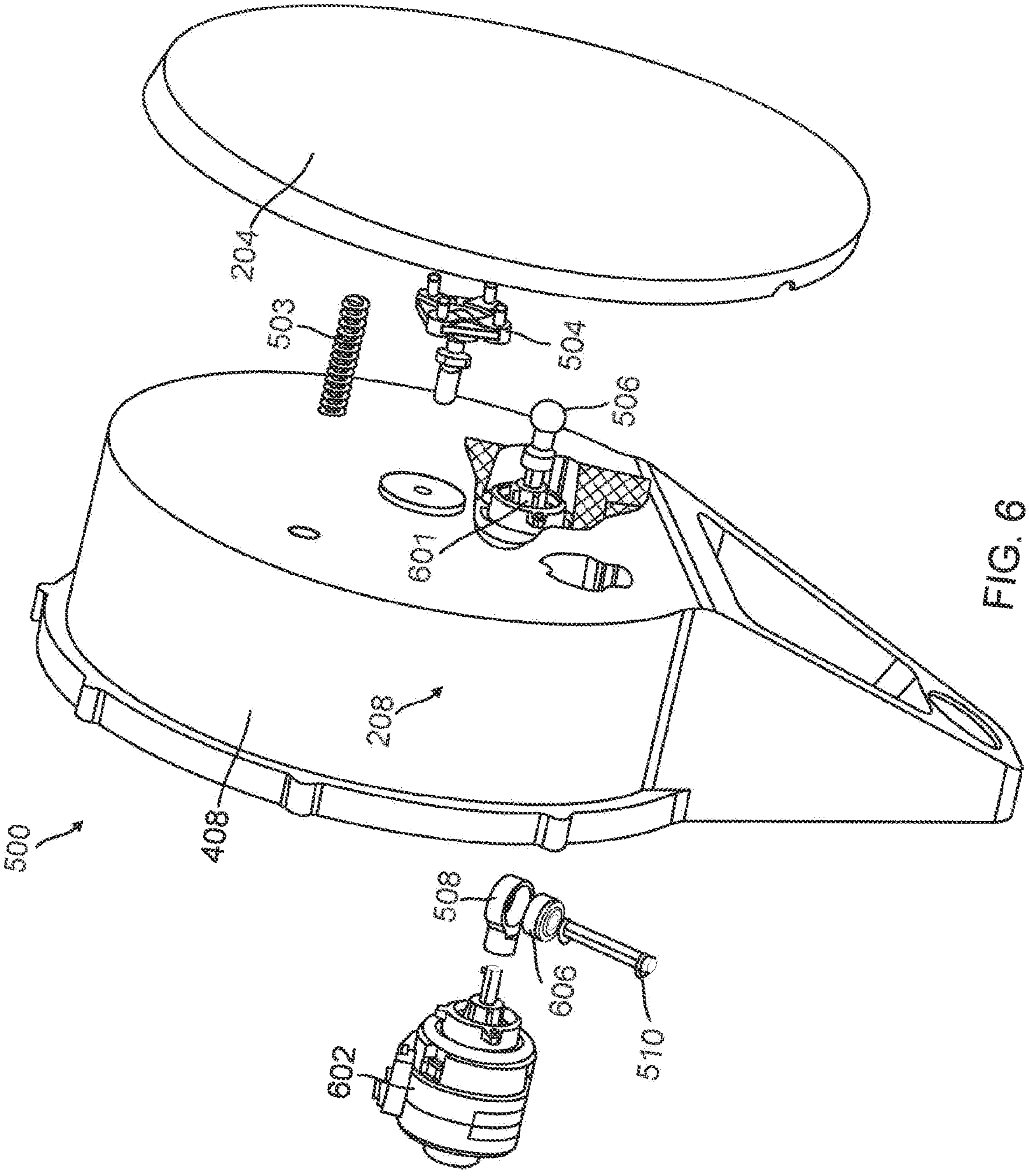
FIG. 6 is a diagram further illustrating the example steerable subreflector assembly of FIG. 5.

FIG. 6 is a diagram further illustrating the example steerable subreflector assembly 500 of FIG. 5. More specifically, FIG. 6 is similar to FIG. 5, but provides an exploded view of FIG. 5. Accordingly, various components (503, 504, 508, 510, 601, 602) beneath the cover and/or beneath the reflector surface when in the components' installed locations may be illustrated more clearly. As with FIG. 5, the example steerable subreflector assembly 500 includes the subreflector 204 and the tilt assembly 208. Additional details of the tilt assembly 208, e.g., the first actuator (601) and the second actuator (602), are illustrated. The first actuator (601), in this example embodiment, comprises a spherical adapter connection 506. The second actuator (602), in this example embodiment, comprises a spherical rod end connection 508 having the shaft 510 and a pivot bearing 606. The tilt assembly 208 may include each of the components of FIGS. 5-10 except the subreflector 204. For example, the tilt assembly 208 may include the spring 503, the central pivot assembly 504, the first actuator spherical adapter connection 506, the second actuator spherical rod end connection 508 having the shaft 510 and the pivot bearing 606, the first actuator (601), the second actuator (602), and an enclosure, e.g., which may be formed by the base structure 408 and the enclosure lid 406 (not shown in FIG. 6), and a central pivot assembly 504.

FIG. 6 illustrates the first actuator (601) using a cut-away view. The cut-away view allows first actuator (601) to be viewed in the installed position, while still being able to view the first actuator (601). Second actuator (602) is illustrated well clear of the enclosure. Accordingly, details of the second actuator 602 and the installation of the pivot bearing 606 and shaft 510 are illustrated. The second actuator 602, pivot bearing 606, and shaft 510 are also illustrated in an exploded view. It will be understood that second actuator (602) may generally be within the enclosure when installed in the example embodiment. (FIG. 7 provides a view of both motors 601, 602 in an installed position.)

Figure 7:
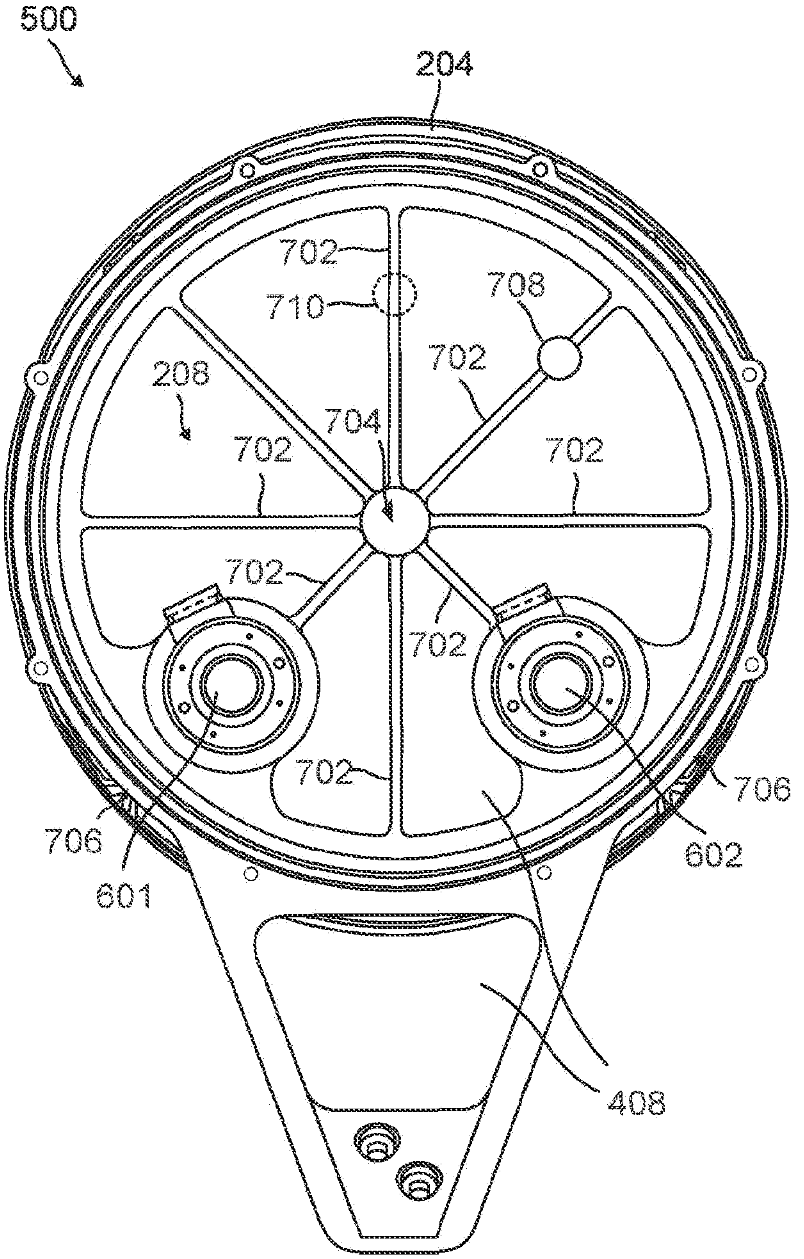
FIG. 7 is a diagram further illustrating the example steerable subreflector assembly of FIGS. 5 and 6.

FIG. 7 is a diagram further illustrating the example steerable subreflector assembly 500 of FIGS. 5 and 6. More specifically, FIG. 7 illustrates a bottom view of the internal components of the tilt assembly 208, as viewed from the side of base structure 408 that is opposite of the subreflector 204, but with the enclosure lid removed to show the internal components of the enclosure. Visible in FIG. 7 is the periphery of the back side of subreflector 204, as well as the base structure 408 that is positioned between the subreflector 204 and the internal components of the tilt assembly 208. The first and second actuators 601/602 are illustrated in their installed position, attached to the interior side of the base structure 408. Thus, FIG. 7 provides a view of the motors 601, 602 in an installed position.

The tilt assembly 208 further comprises support ribs 702 of the base structure 408. The support ribs 702 may provide strength and rigidity to the base structure 408. For example, the support ribs 702 may particularly provide strength and rigidity in the areas where contacts are made between the base structure 408 and the subreflector 204. For example, the subreflector 204 may be supported by one or more of connections to the actuators 601, 602, as well as other contact points discussed in greater detail with respect to FIGS. 8-11, below.

The closer the first actuator (601), the second actuator (602), or both the first actuator (601) and the second actuator (602) are to the center 704, the less accurate the tilt of the subreflector 204 may generally be. Accordingly, both the first actuator (601) and the second actuator (602) may be placed outward from the center 704, generally closer to the edge 706 than the center 704. Placement of the motors 601, 602 at or near the edge 706 may generally lead to more accurate tilting of the subreflector 204.

FIG. 7 illustrates an example location 708 for a counter-force device, such as a spring, that is opposite the first actuator (601) having a connection to the back of the subreflector 204 that is not fixed. In such an example, the spring helps maintain the connection between the first actuator (601), e.g., between the first actuator spherical adapter connection 506 (of FIG. 6) and the subreflector 204. For example, in one example embodiment, a counter-force device may be connected to the base structure. The counter-force device may be in contact with the backside of the subreflector. In an example embodiment, the first and second actuators and the counter-force device may contact the backside of the subreflector at first, second, and third points, respectively. The third point may be located on a first portion of the backside of the subreflector. The first and second points may be located on a second portion of the backside of the subreflector opposite the first portion. The first portion may be a first half of the subreflector and the second portion may be the other half of the subreflector.

Another example embodiment may include two fixed connections to the back of the subreflector 204. When two fixed connections to the back of the subreflector 204 are used, the counter-force device such as a spring may be used to reduce backlash. In such an example, the counter-force device such as a spring might be moved to a location 710 that opposite both the first actuator (601) and the second actuator (602) and angularly equidistant from the first actuator (601) and the second actuator (602) such that the counter-force device may generally reduce backlash equally between the first actuator (601) and the second actuator (602).

The example of FIG. 7 also illustrates that the first actuator (601) and the second actuator (602) are 90° (270°) from each other and 45° (135°) from an axis (e.g., elevation) of the antenna of the example steerable subreflector assembly 500. Having the first actuator (601) and the second actuator (602) 45° from an axis of the antenna, for the example steerable subreflector assembly 500, may lead to better accuracy in antenna pointing because each actuator (e.g., first actuator (601) and second actuator (602)) may contribute to moving the antenna beam in each antenna axis, e.g., elevation and azimuth. It may generally take multiple steps in a stepper motor to move the antenna beam. In an example embodiment, the first actuator (601) and the second actuator (602) may add movement in a direction and subtract movement in a direction such that fractional step sizes, e.g., half step sizes, may be generated. For example, fractional step sizes may be generated when a movement by one actuator contributes partly to elevation and partly to azimuth. For example, a movement of one actuator 601, 602 may counteract or partially counteract movement of the other actuator 602, 601, in one or more of altitude and azimuth.

The example of FIG. 7 illustrates various specific locations for the various components and various angular relationships and relative distances between various components. It will be understood, however, that FIG. 7 and the other figures described herein are only examples, and other suitable spatial relationships and layouts may be used. Generally, two or more actuators (motors) and one or more counter-force devices (springs) might be placed any distance from the center 704 from just outside the center 704 area to the edge 706. Generally, two or more actuators and one or more counter-force devices might have any angular relationship with each other, e.g., as long as they are not acting on the exact same points and/or at the same angular locations.

In an example embodiment, it may be necessary to know a position of the actuators, e.g., the first actuator (601) and the second actuator (602). In an example embodiment, where the actuators are stepper motors, a limiting position of the subreflector 204 may be set by a limiting position of one or more of the motors. Accordingly, one or more of the motors may be positioned in a "home," known, or predetermined position by moving the motor a predetermined number of steps that may guarantee that the motor has moved as far as it can in a predetermined direction. For example, a motor with the limiting position of the subreflector set by a limiting position of the motor may be commanded to move greater than or equal to the greatest possible number of step in a direction, e.g., 200 steps. Accordingly, the stepper motor will reach the motor's maximum position in that direction. (Any extra steps may not move the motor further.) In an example embodiment, the limiting position in one direction may be the "home" location for that motor, In another example embodiment, the motor may then be commanded a number of steps in the opposite direction, e.g., 50 steps "back," to the "home" position. In this manner, the position of the subreflector 204 can be "reset" to a particular position, on command, so that subsequent positioning of the subreflector can be known.

In an example, the limiting positions of the subreflector 204 along two directions may be set by both motors, e.g., the first actuator (601) and the second actuator (602). Accordingly, both motors may be positioned in a "home," known, or predetermined position to set the subreflector in a "home," known, or predetermined position by moving each motor a predetermined number of steps that may guarantee that the motor has moved as far as it can in a predetermined direction. For example, each motor may be set to the motor's limiting position by commanding each motor to move greater than or equal to the greatest possible number of step in a direction, e.g., 200 steps. Accordingly, each stepper motor will reach the motor's maximum position in each of the directions selected. (Any extra steps may not move the motors further.) In an example embodiment, the limiting position in each direction may be the "home" location for the corresponding motor. In another example embodiment, the motors may each then be commanded a number of steps in the opposite direction, e.g., 50 steps "back," to the "home" position. Moreover, any suitable systems for positioning the subreflector to known positions can be used, including but not limited to using limit switches or encoders.

Figure 8:
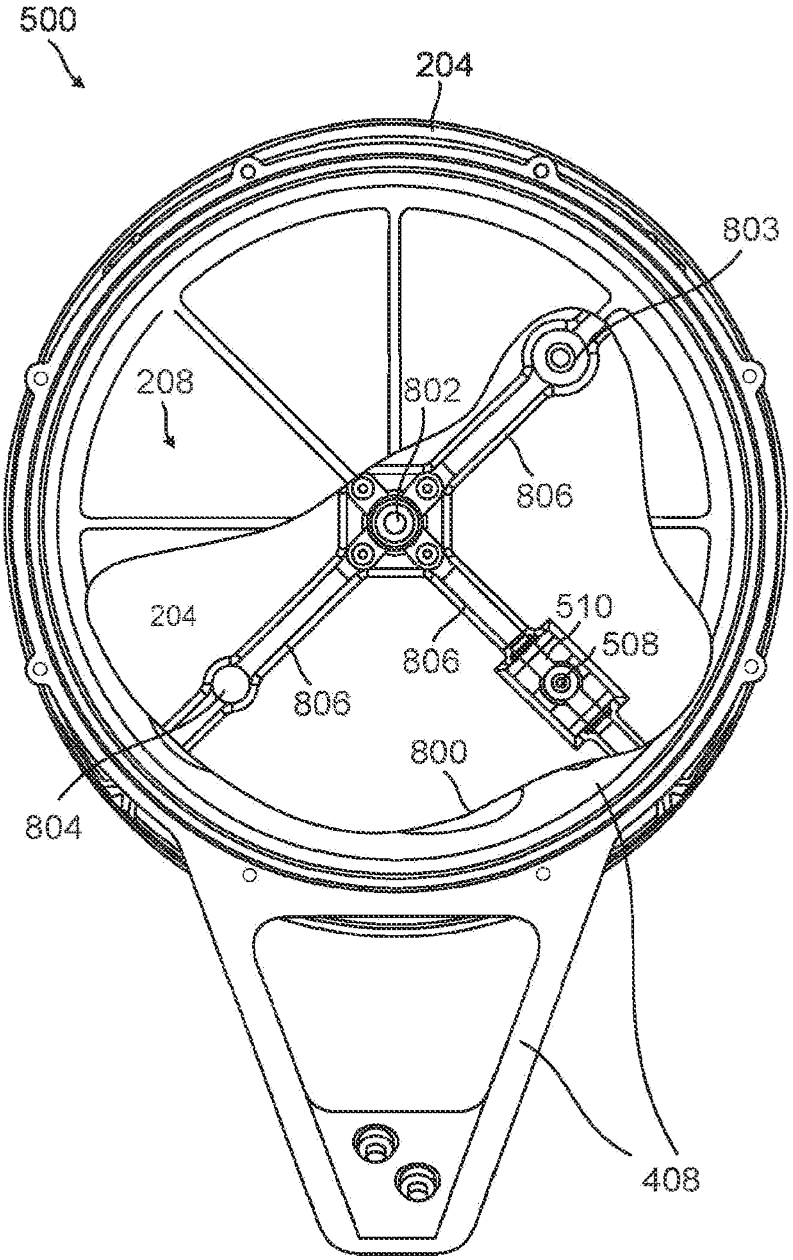
FIG. 8 is a diagram further illustrating the example steerable subreflector assembly of FIGS. 5-7.

FIG. 8 is a diagram further illustrating the example steerable subreflector assembly 500 of FIGS. 5-7. More specifically, FIG. 8 illustrates another bottom view of the base structure 408, from the perspective of the side of the enclosure opposite the subreflector 204, but this time with a cut-away portion 800 illustrating details of the back of the subreflector 204. For example, FIG. 8 illustrates a central pivot connection point 802 on the back side of the subreflector 204, a spherical rod end adapter receiver 804 located in the back side of the subreflector 204, and support ribs 806. The support ribs 806 may provide strength and rigidity to the subreflector 204, allowing the subreflector 204 to maintain its shape, despite forces from the spring and actuators, in various positions and various angles that the subreflector 204 may be placed in to transmit, receive, or transmit and receive satellite (or other) electromagnetic signals. For example, the support ribs 806 may particularly provide strength and rigidity in the areas where contact is made with the subreflector (by the spring, central pivot, and actuators). For example, the subreflector 204 may comprise support ribs 806 where the subreflector is in contact with the actuators (at the spherical rod end connection 508/510, spherical rod end adapter receiver 804), as well as other contact points such as the central pivot connection point 802 and spring connection point 803.

Thus, the support ribs 806 may further comprise a first actuator spherical rod end adapter receiver 804 and second actuator spherical rod end connection 508. In an example embodiment, these two ribs may be perpendicular to each other. Furthermore, the central pivot connection point 802 may be located at a point where the perpendicular support ribs 806 having the first actuator spherical rod end adapter receiver 804 and second actuator spherical rod end connection 508 meet. In the illustrated embodiment of FIG. 8, the connections between the subreflector 204 and each actuator 601, 602 are perpendicular to each other. However, it will be understood that other angles, e.g., from near zero degrees to near 180°, may be used. Generally, angles near 90° may be preferable, however.

Additionally, the example steerable subreflector assembly 500 includes the subreflector 204 and the tilt assembly 208. The tilt assembly 208 may include base structure 408. The tilt assembly 208 may include components as described with reference to FIGS. 5 and 6, for example.

Figure 9A:
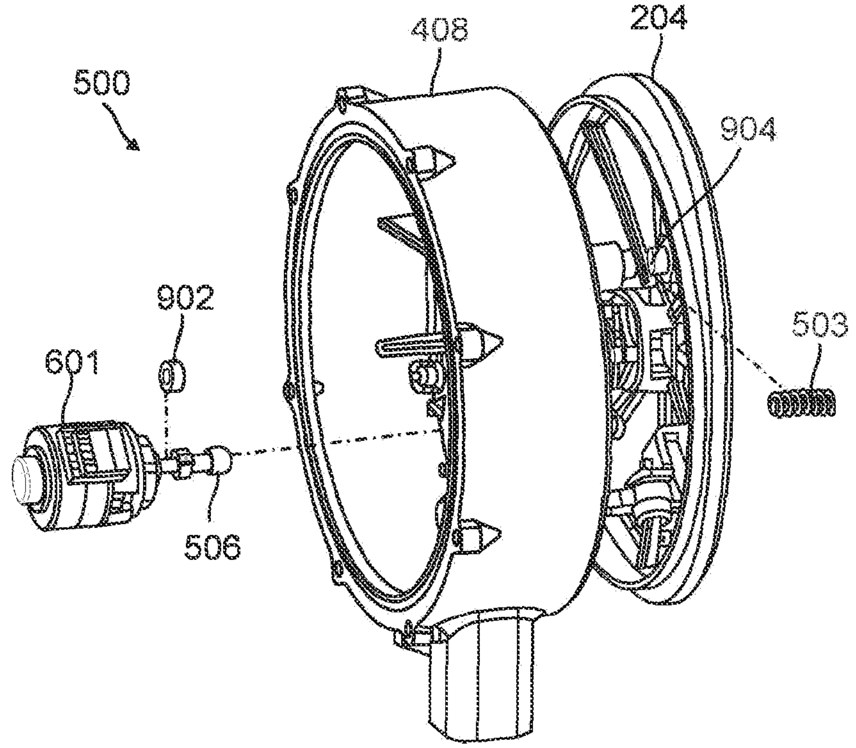
FIGS. 9A and 9B are diagrams further illustrating the example steerable subreflector of FIGS. 5-8.
Figure 9B:
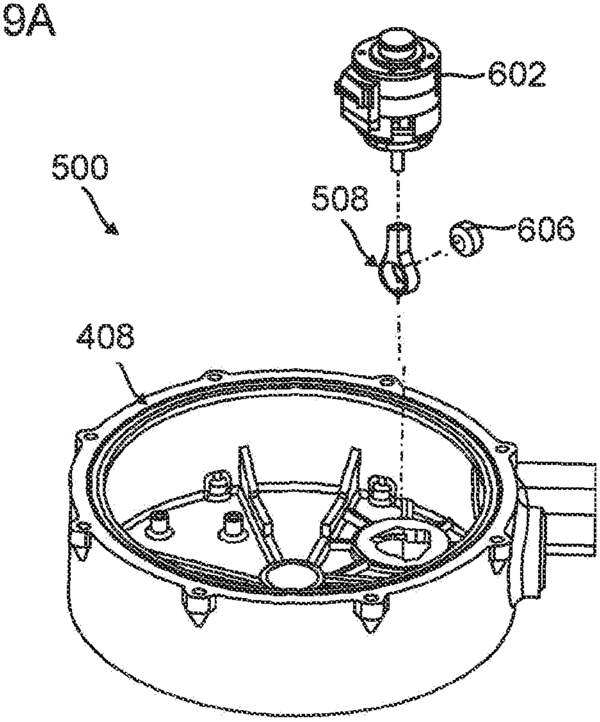

FIGS. 9A and 9B are diagrams further illustrating the example steerable subreflector assembly 500 of FIGS. 5-8. FIGS. 9A and 9B provide an exploded view that illustrates details of the various parts discussed with respect to FIGS. 4-8. FIG. 9A illustrates the actuator placement of the first actuator 601. The first actuator 601 may be mounted to the planar portion of the base structure 408. The first actuator (601) is illustrated having the spherical adapter connection 506 and a bearing 902. The spherical adapter connection 506 may be moved linearly by first actuator (601) along a line generally perpendicular to the planar portion of the base structure 408. Accordingly, first actuator (601) may move the subreflector, as is discussed in more detail with respect to FIG. 10. FIG. 9A also illustrates placement of the spring 503. The spring 503 is illustrated in an exploded position and may be installed at location 904, as illustrated in the figure.

FIG. 9B illustrates the second actuator (602). The second actuator 602 may be mounted to the planar portion of the base structure 408. The second actuator (602) is illustrated as having the spherical rod end connection 508 with the pivot bearing 606. The spherical rod end connection 508 may be moved linearly by second actuator (602) along a line generally perpendicular to the planar portion of the base structure 408. Accordingly, second actuator (602) may move the subreflector 204, as is discussed in more detail with respect to FIGS. 10-13. However, because the second actuator (602) has the spherical rod end connection 508 with the pivot bearing 606, the connection, at the pivot bearing 606, may slide along the shaft 510.

Figure 10:
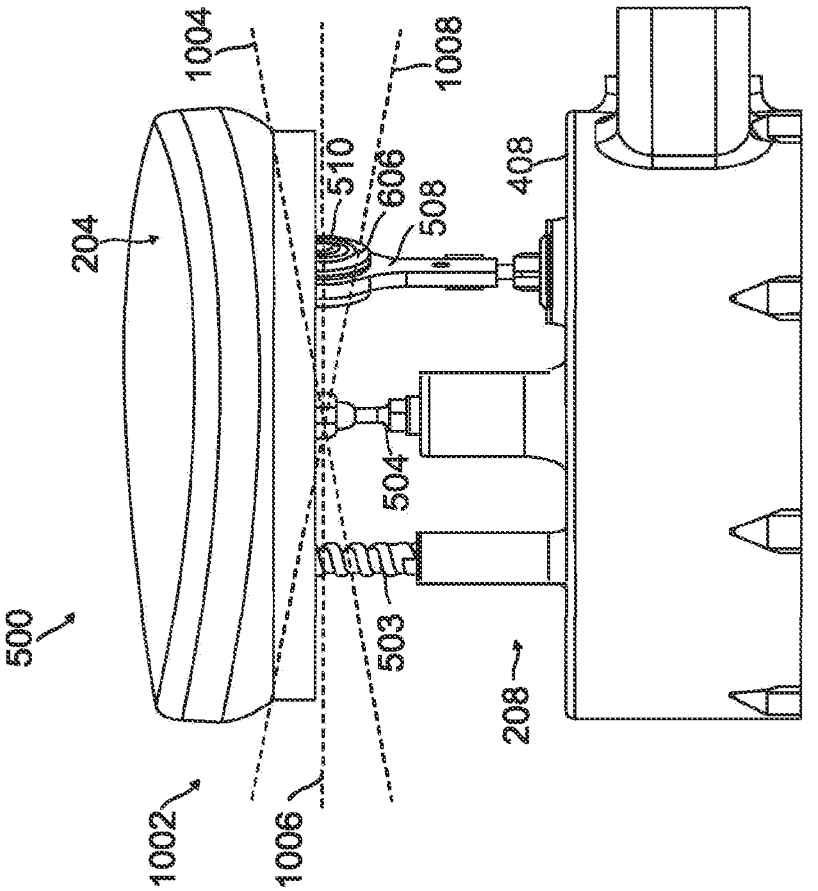
FIG. 10 is a diagram illustrating a subreflector mounted to a tilt assembly.

FIG. 10 is a diagram further illustrating a subreflector mounted to a tilt assembly of FIGS. 5-9. More specifically, FIG. 10 provides a side view that highlights connections between the subreflector 204 and the tilt assembly 208. In particular, the example steerable subreflector assembly 500 includes the subreflector 204, a spring 503, a central pivot assembly 504, a first actuator spherical adapter connection 506 (see FIG. 5), a second actuator spherical rod end connection 508 having a shaft 510 and a pivot bearing 606, and base structure 408. The control signal 257 of FIG. 2 may be used to tilt the subreflector 204 in a plurality of tilt positions 1002 illustrated in FIG. 10. The plurality of tilt positions 1002 may be generally indicated by dotted lines. The tilt position 1002 may be used to move the beam (e.g., the beam indicated as along the line 300 of FIG. 3) while measuring the corresponding signal strength of a signal (e.g., signal 114) communicated via the antenna at each of the plurality of tilt positions 1002.

In an example embodiment, the motors may be linear motors More specifically, in an example embodiment, the motors may be linear stepper motors. Accordingly, in an example, both linear stepper motors may change the angle of the subreflector 204. For example, for the first actuator (601), the contact between the subreflector 204 and the first actuator 601 may be done at a single point, e.g., at the spherical adapter connection 506. Because the spherical joint only touches the subreflector 204 surface on a single point, the contact joint may be represented by a point on a surface. Accordingly, the single point, e.g., at the spherical adapter connection 506 may move linearly based on movement of a linear stepper motor, e.g., first actuator (601). Second actuator (602) may also be a linear motor, e.g., a linear stepper motor.

Second actuator (602) includes a contact between the subreflector 204 and the second actuator 602 provided through a spherical adapter that may slide on a shaft 510 connected to the subreflector 204. Accordingly, the contact joint may be represented by a point on a line. In an example, the purpose of having a point sliding on a line may be to lock the rotation of the subreflector 204 because such a device may only rotate on the device's azimuth axis and elevation axis. In an example embodiment, a spring may maintain constant contact between the subreflector 204 and a shaft with a spherical rod-end. Rotation may be locked out by the use of the shaft. By using two linear motors, a push-pull maybe develop. Accordingly, the two linear motors, e.g., within the enclosure, e.g., the base structure 408 and the enclosure lid 406, may control the angle of the subreflector 204. For example, the angle of the subreflector 204 may be changed in small increments set by the size of the steps of the stepper motors. Generally, the size of the steps of the stepper motors may be much finer than the actual steps that may be needed to create a measurable difference in the performance of the antenna. For example, it may take many steps to create a measurable difference in the performance of the antenna 210. Accordingly, in an embodiment, movements of the linear stepper motors may be in 5, 10, 15, 20, or more steps, e.g., depending on the size of the steps of the linear stepper motors and the changes in angle due to the steps of the stepper motors, e.g., based on the geometry of the connections between the subreflector 204 and the stepper motors.

As illustrated in FIG. 10, the subreflector 204 may be tilted in various angles, e.g., by the motors of actuators 601, 602, in conjunction with the spring 503. FIG. 10 provides a 2-D representation of example tilt angles. It will be understood, however, that the subreflector 204 may be tilted in various angles in three dimensions, e.g., such that a spiral or other set of beam patterns may be formed. The plurality of tilt positions 1002 may include a neutral tilt position 1006 of the subreflector 204. The plurality of tilt positions 1002 may include a first predetermined maximum angle 1004 from a neutral tilt position 1006 of the subreflector 204. The plurality of tilt positions 1002 may include a second predetermined maximum angle 1008 from a neutral tilt position 1006 of the subreflector 204. It will be understood that the maximum angle may be in any direction around the subreflector, e.g., as indicated in the 2-D figure, into the page, out of the page, or any other angle. Furthermore, while the maximum angles are depicted as a fixed magnitude, it will be understood that the maximum angles may vary depending on the direction of the tilt. For example, the maximum tilt may be limited in some directions and not as limited in other directions. Generally, however, the maximum angle may be the same or similar regardless of tilt direction in most example embodiments.

Figure 11:
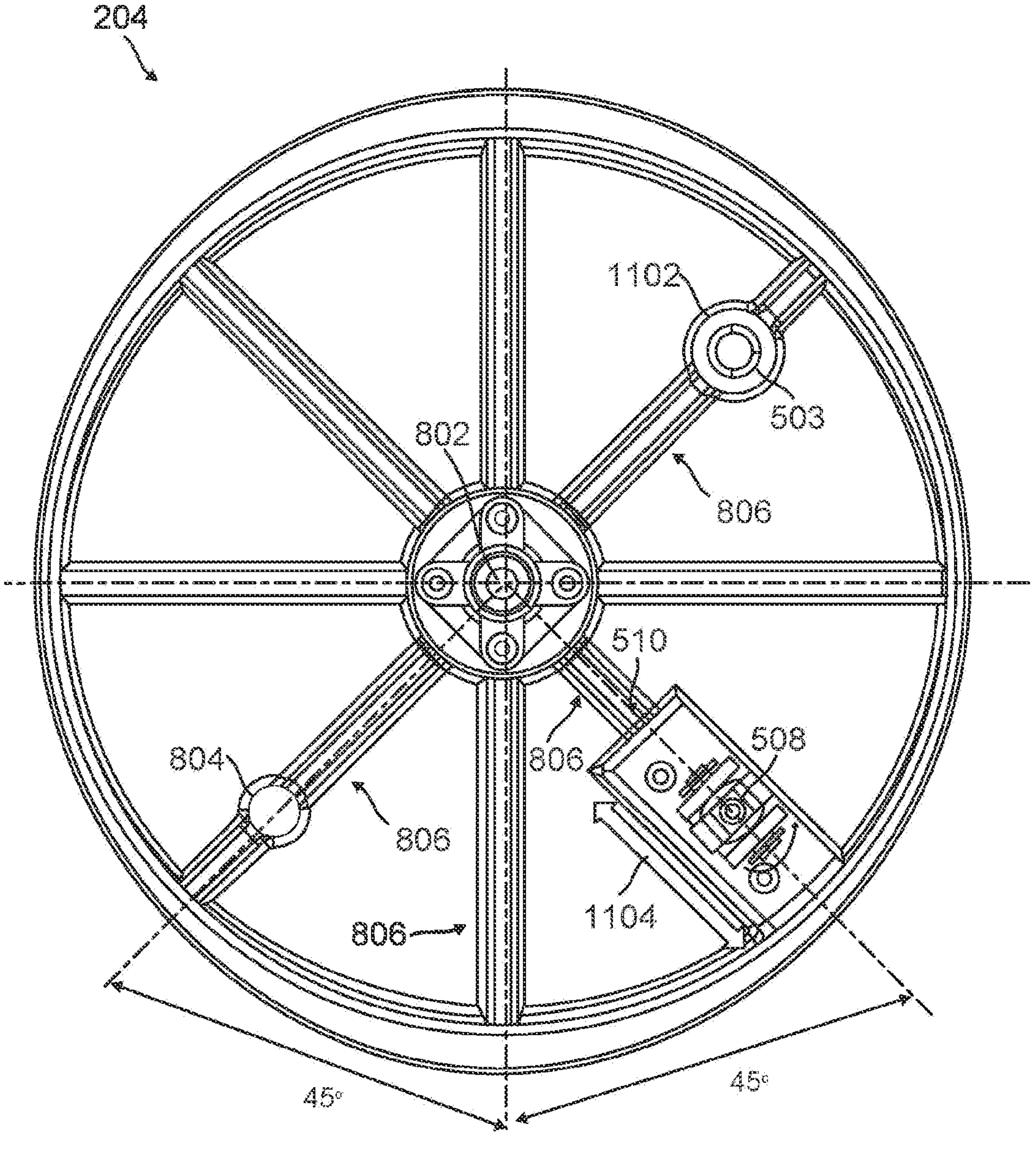
FIG. 11 is a diagram further illustrating the example steerable subreflector of FIGS. 5-10.

FIG. 11 is a diagram further illustrating the example steerable subreflector 204 of FIGS. 5-10. More specifically, FIG. 11 illustrates a back side of the subreflector 204. The example steerable subreflector 204 may include the spherical rod end connection 508 having the shaft 510, as well as the central pivot connection point 802, and the spherical rod end adapter receiver 804. The example steerable subreflector 204 also may include a spring contact surface 1102 for receiving the spring 503. The spring contact surface 1102 may be configured to be pressed on by the spring 503. As discussed with respect to FIG. 8, the support ribs 806 may provide strength and rigidity, allowing the subreflector 204 to maintain its shape in various positions and various angles that the user terminal antenna assembly 400 may be placed in to transmit, receive, or transmit and receive satellite (or other) electromagnetic signals. For example, the support ribs 806 may particularly provide strength and rigidity in the areas where contact is made with the subreflector. For example, the subreflector 204 may be contacted by one or more of actuators 601, 602, and the central pivot.

Additionally, the spherical rod end connection 508 may be configured to move linearly along the shaft 510, as indicated by the arrow 1104. In an example embodiment, having the spherical rod end connection 508 configured to move linearly along the shaft 510 may lock the rotation of the subreflector 204 because the subreflector 204 in such a system can only rotate on the subreflector's 204 azimuth axis and elevation axis. The spherical rod end connection 508 may couple the example steerable subreflector 204 to second actuator (602) through the shaft 510 and the pivot bearing 606 (not shown).

In an example embodiment, the support ribs 806 that include contact points may be perpendicular to each other. For example, the support ribs 806 including the spring contact surface 1102 may be perpendicular to the support ribs 806 including the second actuator spherical rod end connection 508. The support ribs 806 including the spherical rod end adapter receiver 804 may be perpendicular to the support ribs 806 having the second actuator spherical rod end connection 508. However, it will be understood that other angles are also possible. Furthermore, the spherical rod end adapter receiver 804 and the spherical rod end connection 508 contact points (and/or the ribs associated therewith) may both be 45° from a center-line bisecting those contact points/ribs. It will be understood that other angles are also possible.

Figure 12:
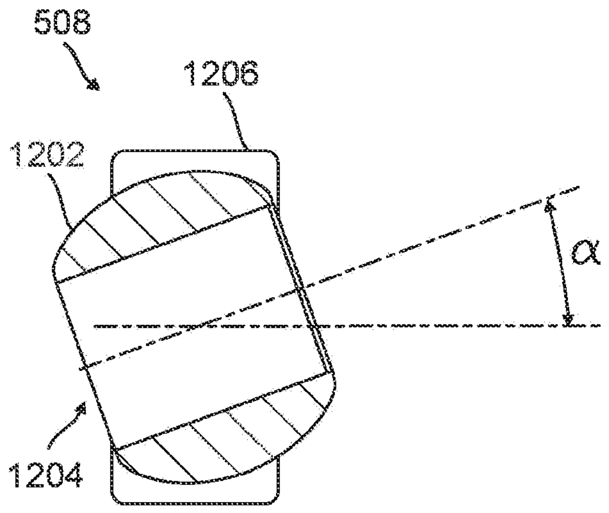
FIG. 12 is a diagram illustrating a spherical rod end adapter.

FIG. 12 is a diagram illustrating a spherical rod end connection 508. In an example embodiment, the contact between the subreflector 204 and the actuator, e.g., second actuator (602) may be made through a spherical adapter as illustrated in FIG. 12. The spherical rod end connection 508 may include a ball joint 1202. The ball joint 1202 may have a hole or aperture 1204 that allows a shaft to slide linearly along an axis of the hole or aperture 1204. The ball joint 1202 having the hole or aperture 1204 may move within a collar 1206, allowing the angle, α, of the hole or aperture to vary. Accordingly, the angle of the shaft through the hole or aperture 1204 may vary.

Figure 13:
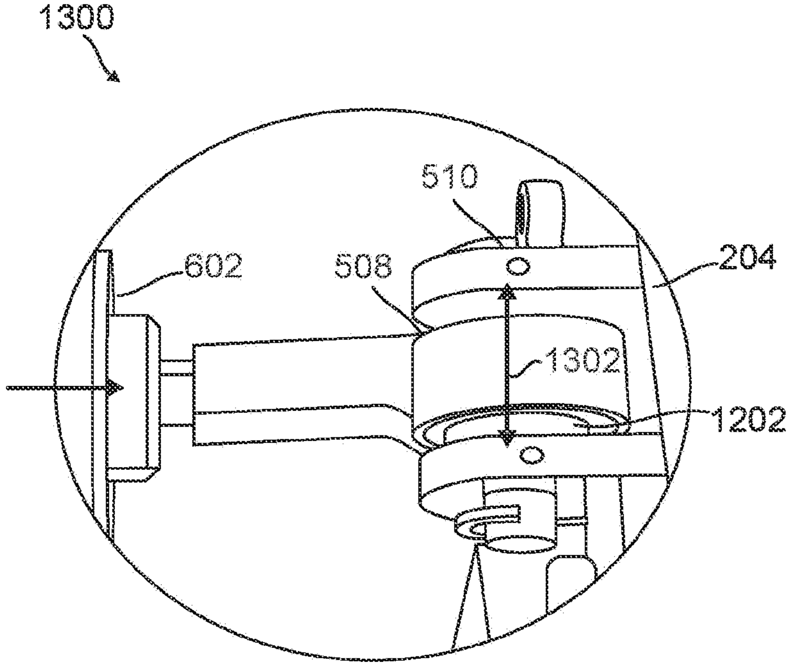
FIG. 13 is a diagram illustrating an installation of the spherical rod end adapter of FIG. 12 connecting a motor to a subreflector.

FIG. 13 is a diagram illustrating an installation 1300 of the spherical rod end connection 508 of FIG. 12 connecting a second actuator 602 to a subreflector 204. As discussed above, the spherical rod end connection 508 may include a ball joint 1202. The ball joint 1202 may have a hole or aperture 1204 that allows a shaft to slide linearly along an axis of the hole or aperture 1204 in FIG. 12, e.g., as indicated by the arrow 1302 parallel to shaft 510. As illustrated in FIG. 13, the shaft 510 is connected to the subreflector 204. Because a shaft is used, the contact joint may be represented by a point on a line, rather than just a single point. The sliding along the shaft 510 may lock the rotation of the subreflector 204 because the subreflector can only rotate on its azimuth axis and elevation axis.

In another example embodiment, both motors may be fixed to the subreflector by a spherical adapter. The fixation of the motor spherical ball push rod may be implemented using a snap-fit connector (see FIG. 14, below) fixed onto the subreflector. The example embodiment does not need a spring to complete the kinematic mechanism, although the spring may be installed on a product to reduce a possible backlash between joints maintaining all kinematic elements in permanent contact.

Figure 14:
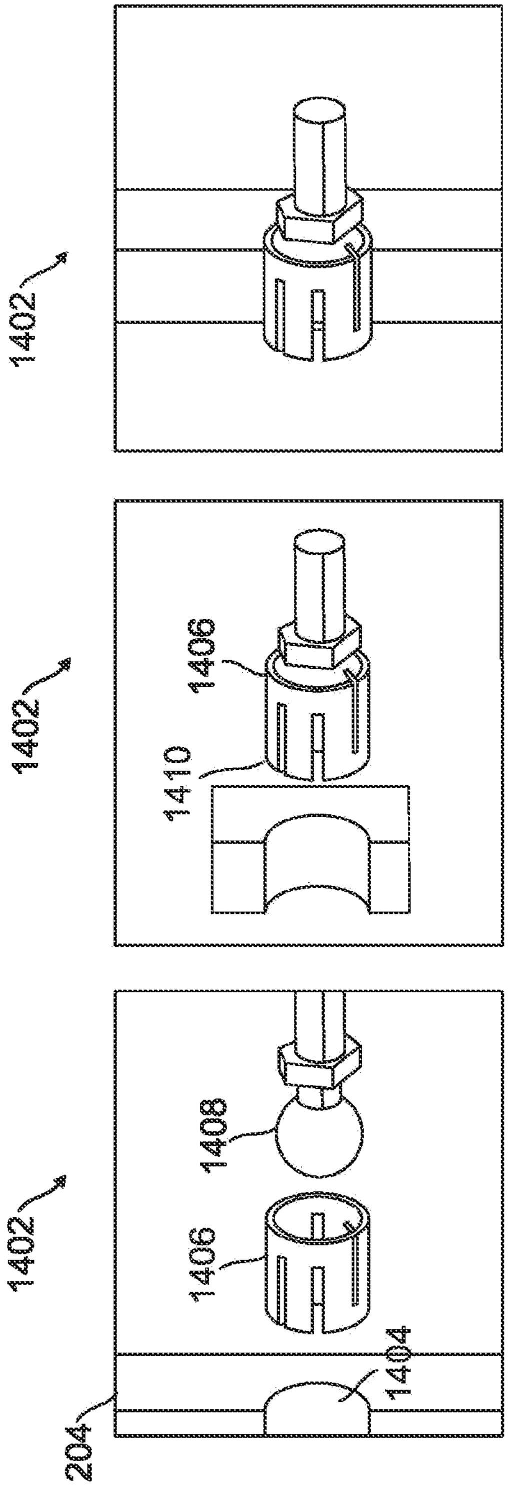
FIG. 14 is a diagram illustrating an example of a kinematic joint.

FIG. 14 is a diagram illustrating an example of a kinematic joint 1402. In various example embodiments, the kinematic joint 1402 may be used for the spherical rod end adapter receiver 804 or the spherical rod end adapter receivers for spherical adapter connections 1606, 1608 discussed with respect to FIGS. 16-18 (below). The diagram illustrates the subreflector 204 including a hole 1404 to receive a snap-fit spherical adapter 1406 of the kinematic joint 1402. An actuator rod end (e.g., spherical adapter connection 506) of FIG. 5 or central pivot (e.g., of central pivot assembly 504), e.g., both represented by a ball joint 1408, may be pressed into the snap-fit spherical adapter 1406. The ball joint 1408 and the snap-fit spherical adapter 1406 may be pressed into the hole 1404. Accordingly, the kinematic joint 1402 may attach to the subreflector 204 by being pressed into the hole 1404 and snap-fitting into the hole 1404 to form a friction fit. The snap-fit spherical adapter 1406 may also include tabs 1410 to secure the snap-fit spherical adapter 1406 and ball joint 1408 in the hole 1404. In an example embodiment, the snap-fit design may allow for attachment without screws. In an aspect, the connection may be a permanent fixture. In one example embodiment, the kinematic joint 1402 is permanently connected to the subreflector 204. In another example embodiment, however, screws may be used to hold pieces together that may form a cylinder, e.g., corresponding to the hole 1404, but capable of being taken apart, for receiving the kinematic joint 1402. In such an embodiment, the kinematic joint 1402 may be disconnected by disassembling the cylinder used as an attachment point of the kinematic joint 1402, e.g., by unscrewing. In other example embodiments, such cylinders may be held together using other fasteners instead of screws, e.g., bolts, nuts, rivets, welds, adhesives, ties, clamps, clips, hooks, latches, pegs, pins, retaining rings, or other fasteners. Moreover, any suitable methods of connecting kinematic joints to the corresponding structures may be used to connect the tilt assembly components to the subreflector.

In an example embodiment, a linear movement of the first actuator in a direction colinear with a first attachment point of the first actuator on the subreflector may cause a first tilt of the subreflector about the central pivot. The axis of rotation may be perpendicular to the direction colinear with the first attachment point. Furthermore, linear movement of the second actuator in a direction colinear with a second attachment point of the second actuator on the subreflector may cause a second tilt of the subreflector about the central pivot. The axis of rotation may be perpendicular to the direction colinear with the second attachment point. The first tilt and the second tilt may be perpendicular to each other.

Figure 16:
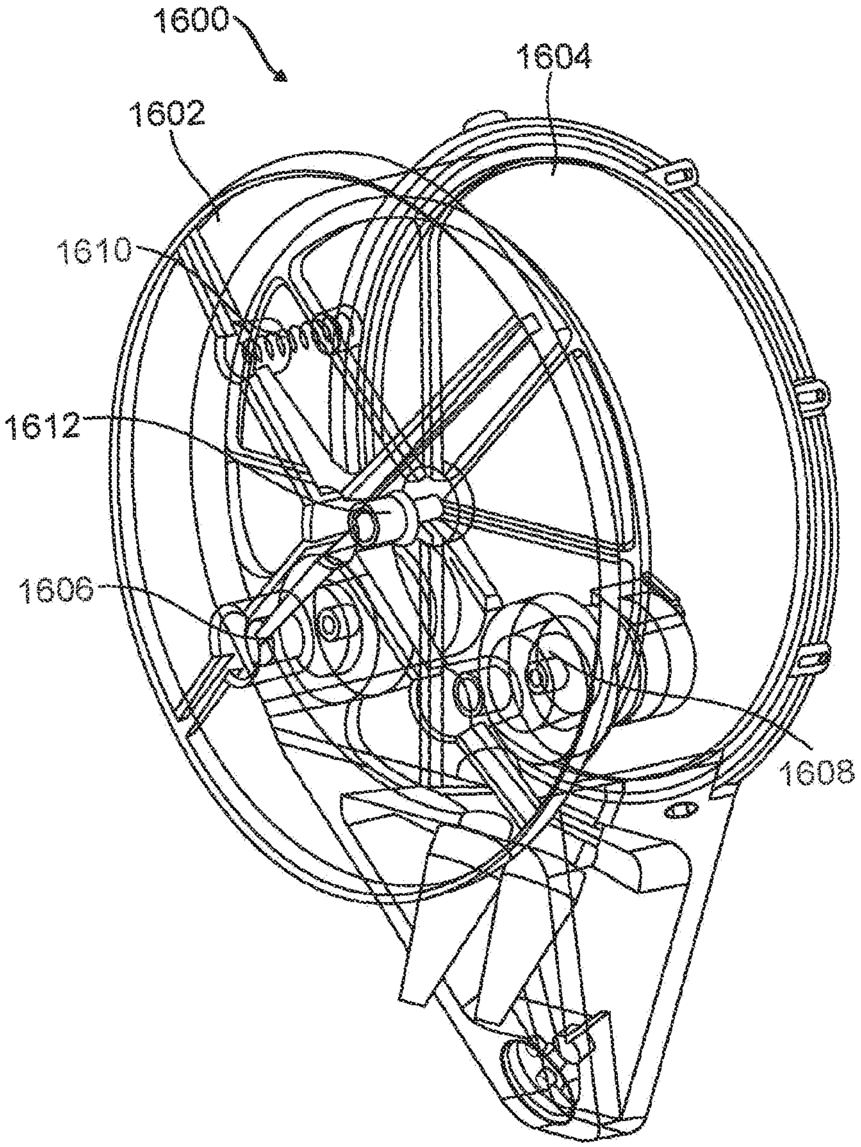
FIGS. 16-18 are diagrams illustrating an example steerable subreflector assembly using a pair of spherical adapter connections to a subreflector.
Figure 17:
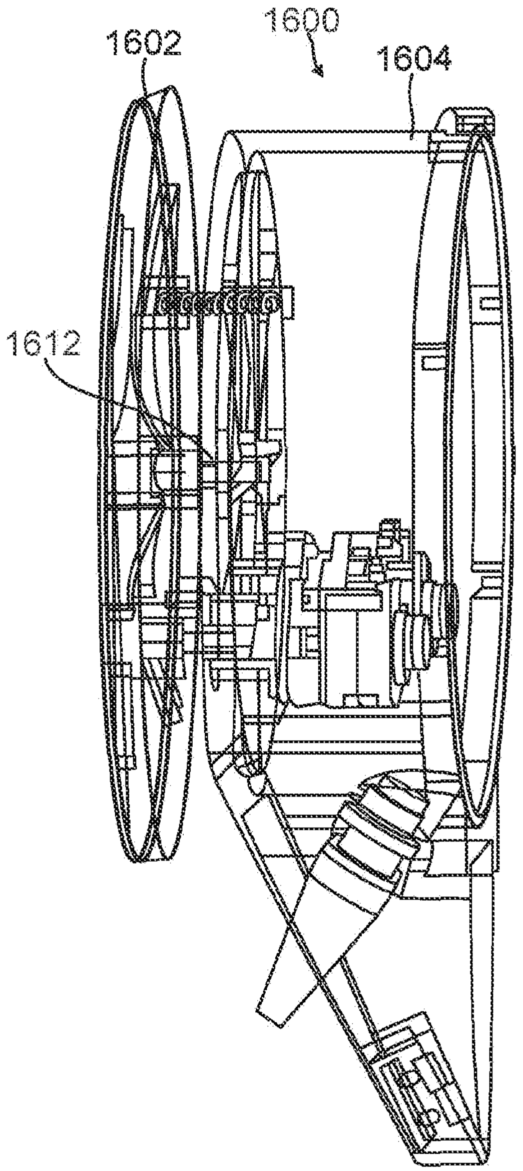
Figure 18:
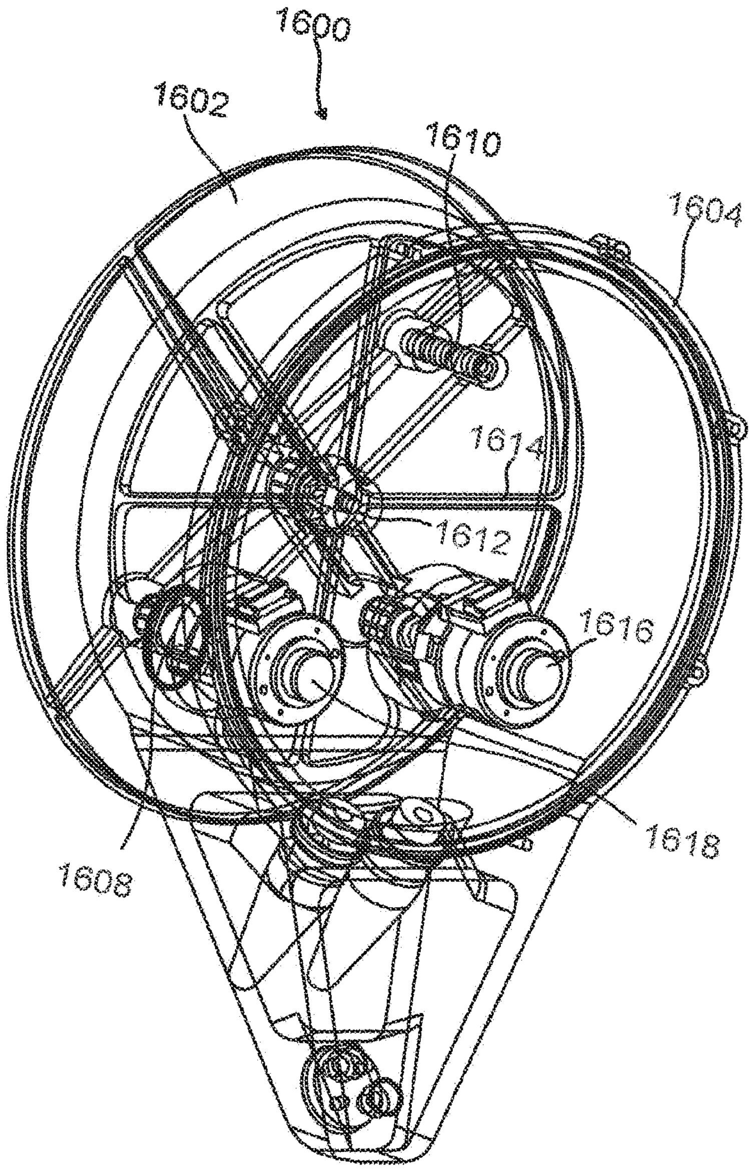

FIGS. 16-18 are diagrams illustrating an example steerable subreflector assembly 1600 using a pair of spherical adapter connections 1606, 1608 to a subreflector 1602. The example steerable subreflector assembly 1600 of FIGS. 16-18 are generally similar to the example steerable subreflector assembly 500 of FIGS. 5-11. Accordingly, the different features of the different embodiments of the example steerable subreflector assembly 500 of FIGS. 5-11 generally apply to the example steerable subreflector assembly 1600 of FIGS. 16-18. The example steerable subreflector assembly 1600 includes an enclosure 1604 as well as a spring 1610 and a center pivot 1612. Ribs 1614 (FIG. 18) may extend from the center pivot 1612. These components generally function as in other embodiments discussed herein. The difference between the example steerable subreflector assembly 500 of FIGS. 5-11 and the example steerable subreflector assembly 1600 of FIGS. 16-18 is that the example steerable subreflector assembly 1600 of FIGS. 16-18 uses two spherical adapters rather than one spherical adapter and one spherical rod end adapter. The example steerable subreflector assembly 1600 of FIGS. 16-18 may be attached at two points rather than a point contact and a shaft attachment.

Thus, in an example embodiment, rather than use a spherical adapter and a shaft, both actuators 1616, 1618 (see FIG. 18) may be fixed to the subreflector by a spherical adapter. Such a design may simplify the installation of the subreflector. The fixation of the motor spherical ball push rod may be done by a snap-fit connector as described with respect to FIG. 14. The snap-fit connector may be fixed onto the subreflector.

This example embodiment may not need a spring to complete the kinematic mechanism. A spring, however, may be installed on an example implementation to reduce any possible backlash between joints maintaining all kinematic elements in permanent contact.

Figure 19:
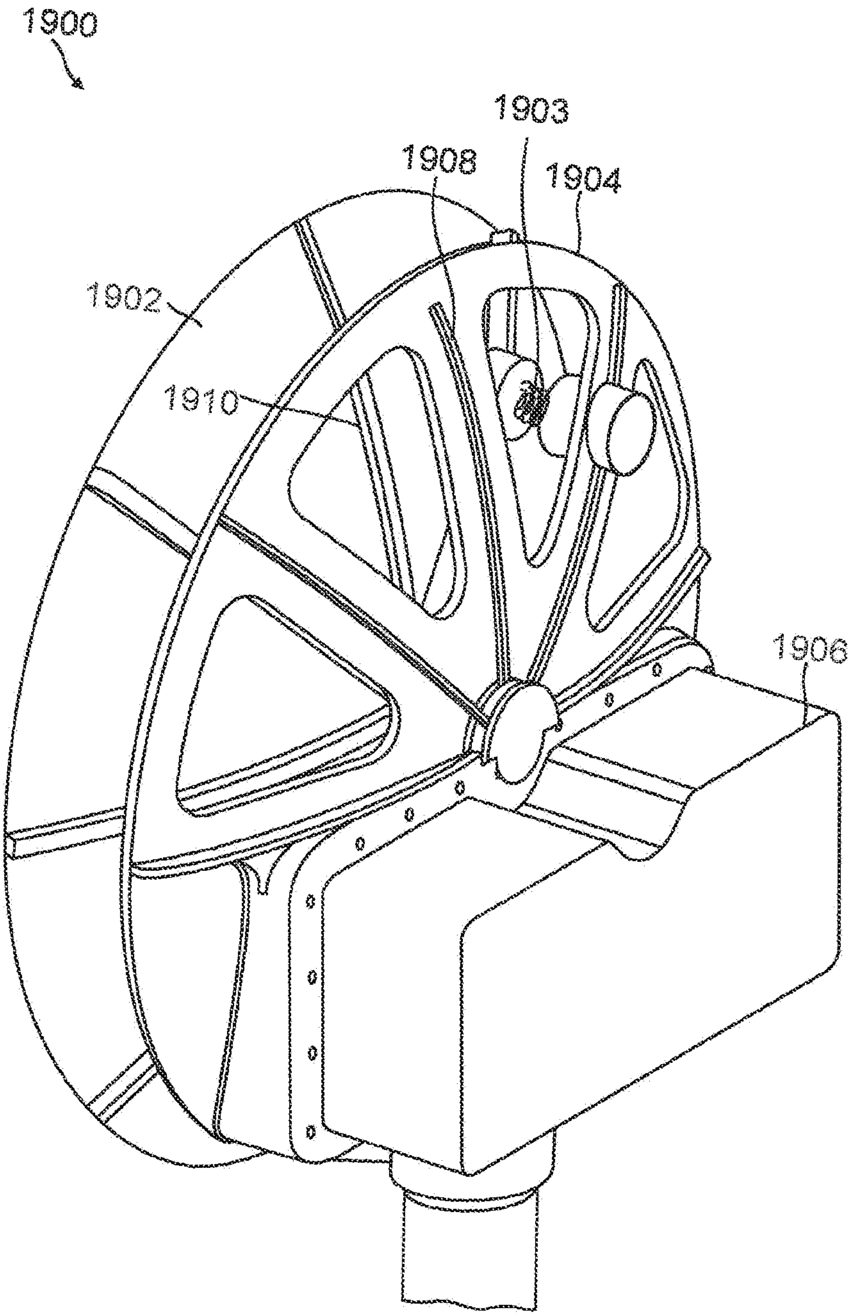
FIG. 19 is a diagram illustrating another example steerable subreflector assembly.

FIG. 19 is a diagram illustrating another example steerable subreflector assembly 1900. The example steerable subreflector assembly 1900 includes a subreflector 1902, a spring 1903, a plate 1904, and an enclosure 1906. The enclosure 1906 may be mounted to the plate 1904. The enclosure 1906 may house the motors that move the subreflector 1902. For example, the motors (hidden from view in FIG. 19 by the enclosure 1906) may be coupled to the plate 1904 and located within the enclosure 1906. More specifically, in an example embodiment, the motors may be coupled, connected, attached, or fixed to the plate 1904 using screws, bolts, nuts, rivets, welds, adhesives, ties, clamps, clips, hooks, latches, pegs, pins, retaining rings, or other fasteners. In an example embodiment, the motors may be linear motors coupled to the plate 1904 such that the motors generally move approximately perpendicular to an opening of the enclosure 1906 through openings in the plate 1904. The enclosure 1906 may be coupled, connected, attached, or fixed to the plate 1904 using screws, bolts, nuts, rivets, welds, adhesives, ties, clamps, clips, hooks, latches, pegs, pins, retaining rings, or other fasteners. An O-ring, gasket, or other material may help seal the connection between the enclosure 1906 and the plate 1904. The combination of the plate 1904 and the enclosure 1906 may generally be held fixed, e.g., at least when the subreflector 1902 is to be moved relative to the plate 1904 and the enclosure 1906. The motors may exert forces against the plate 1904, the enclosure 1906, or the combination of the plate 1904 and the enclosure 1906 to move the subreflector 1902 relative to the plate 1904, the enclosure 1906, or the combination of the plate 1904 and the enclosure 1906. The motors within the enclosure 1906 may be a pair of motors. The pair of motors may be connected to the subreflector 1902 using any of the ways discussed herein. For example, in one embodiment, the pair of motors may be connected to the subreflector 1902 using one spherical adapter and one spherical rod end adapter. In another example embodiment, the pair of motors may be connected to the subreflector 1902 using two spherical adapters. The example steerable subreflector assembly 1900 may include ribs 1908 and open portions 1910. The ribs 1908 and open portions 1910 may provide strength and rigidity while decreasing weight.

The enclosure 1906 (similar to the enclosure, e.g., the base structure 408 and the enclosure lid 406) may be a water proof or water-resistant enclosure. Accordingly, the enclosure 1906 may provide for outdoor satellite antenna installations. The enclosure 1906 may generally enclose some or all the components enclosed in other example embodiments, e.g., by the enclosure of FIG. 4 or the enclosure 1906. A linkage may be provided between the motors and the subreflector 1902, e.g., one spherical adapter and one spherical rod end adapter or two spherical adapters. A portion of the linkage between the motors and the subreflector 1902 may be external to the enclosure 1906. For example, a portion of the linkage between the motors and the subreflector 1902 may be external to the enclosure 1906 to move the subreflector 1902. The enclosure 1906 may generally shield the components within it from the elements, such as rain, snow, dust, or other potential contaminants. Furthermore, because the steerable subreflector assembly 1900 may generally be pointed such that any openings on the enclosure are pointed down, the enclosure 1906 may generally shield the linkage between the motors and the subreflector 1902 from the elements, as well. Additionally, any openings may be sealed or covered in any suitable way while still allowing movement of the linkages.

Figure 15:
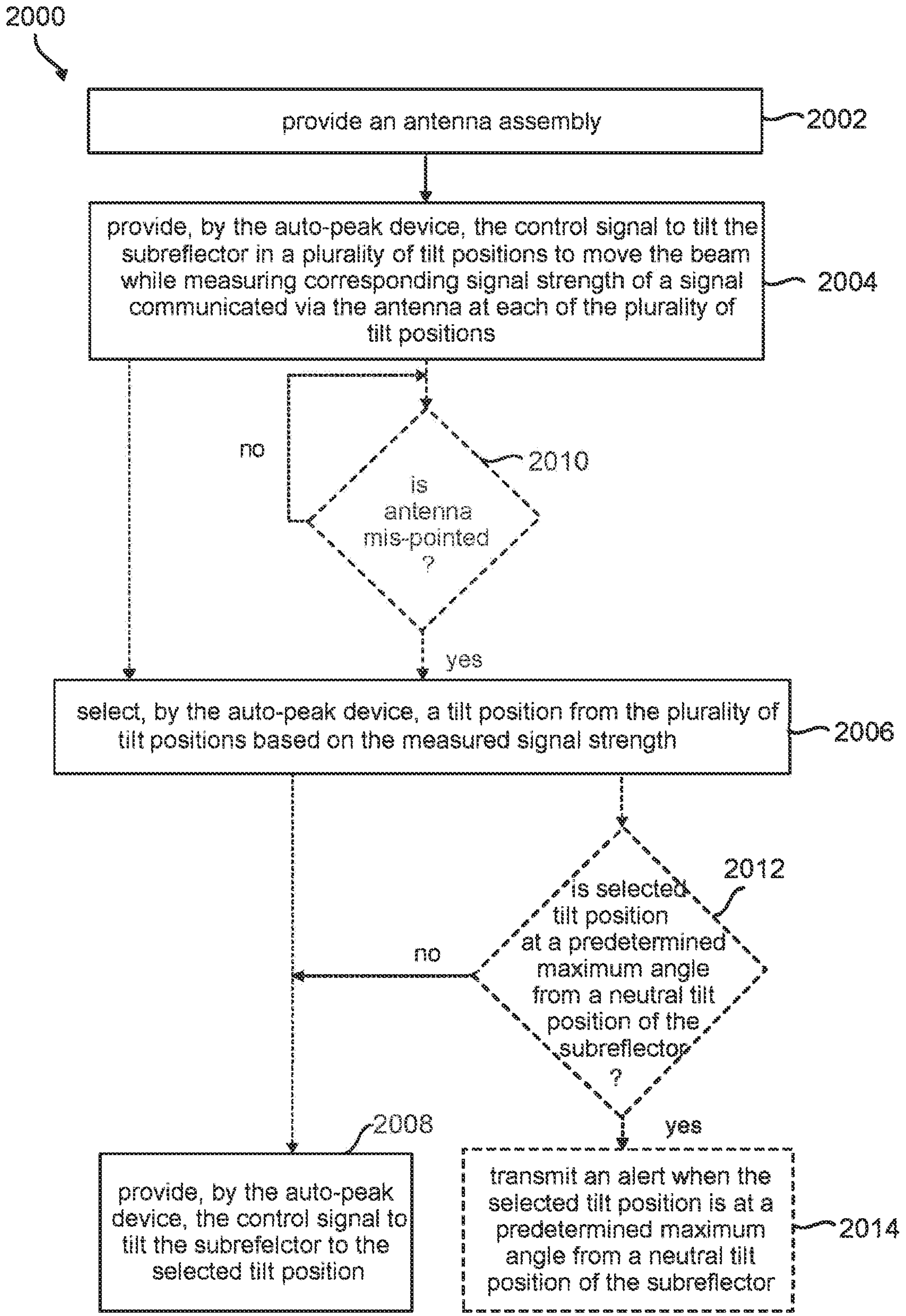
FIG. 15 is a flow diagram illustrating an example method.

Referring back to FIG. 15, the figure is a flow diagram illustrating an example method of antenna pointing 2000. The example method of antenna pointing 2000 illustrated in FIG. 15 includes providing a user terminal antenna assembly (2002), providing the control signal (2004), selecting a tilt position (2006), and providing the control signal to tilt the subreflector to the selected tilt position (2008).

As discussed above, the method of antenna pointing 2000 includes providing a user terminal antenna assembly (2002). For example, the method of antenna pointing 2000 may include providing a user terminal antenna assembly 104. The antenna assembly may include an antenna 210 and an auto-peak device 282. The antenna 210 may include a reflector 220, a subreflector 204 coupled to the reflector 220 via the single support boom 302, and a feed 202 and a transceiver assembly 222 on the single support boom 302. The feed 202 may be oriented relative to the reflector 220 and the subreflector 204 to produce a beam (e.g., a beam having a boresight direction along line 300). The antenna 210 may further include a tilt assembly 208 to tilt the subreflector 204 relative to the reflector 220 and the feed 202 to move the beam in a pattern in response to a control signal 257. In an example embodiment, the tilt assembly within the antenna assembly includes a central pivot. In an example embodiment, the tilt assembly 208 may further include a plurality of linear stepper motors configured to move the subreflector about the central pivot and a spring configured to dampen play within the tilt assembly 208, e.g., reduce backlash or keep the motor connections in contact with the subreflector. In an example embodiment, the reflector within the antenna assembly comprises an offset fed reflector.

The method of antenna pointing 2000 includes providing the control signal (2004). For example, the method of antenna pointing 2000 may include providing, e.g., by the auto-peak device 282, the control signal 257 to tilt the subreflector 204 in a plurality of tilt positions 1002 to move the beam (e.g., line 300) while measuring corresponding signal strength of a signal (e.g., signal 114) communicated via the antenna at each of the plurality of tilt positions 1002 (See FIG. 10).

The method of antenna pointing 2000 includes selecting a tilt position (2006). For example, the method of antenna pointing 2000 may include selecting, e.g., by the auto-peak device 282, a tilt position 1002 from the plurality of tilt positions 1002 based on the measured signal strength (e.g., of signal 114).

The method of antenna pointing 2000 includes providing the control signal to tilt the subreflector 204 to the selected tilt position (2008). For example, the method of antenna pointing 2000 may include providing, e.g., by the auto-peak device 282, the control signal 257 to tilt the subreflector 204 to the selected tilt position (e.g., of the plurality of tilt positions 1002). In an example embodiment, providing the control signal to tilt the subreflector 204 in the plurality of tilt positions and selecting the tilt position is performed to verify an installation of the antenna assembly.

In an example embodiment, the plurality of tilt positions comprises a series of positions along at least one of a spiral search, a step-size search, and a grid search, the control signal beam steering the beam along the series of positions.

In an example embodiment, a determination may be made that an antenna is mis-pointed (2010). For example, the antenna 210 may be mis-pointed. The determination that the antenna is mis-pointed may be made by (1) measuring current signal strength of a signal received by the antenna 210, (2) running through a series of other antenna positions of the antenna 210, e.g., using a spiral search pattern, to measure a series of other signal strengths for the series of other antenna positions, (3) identifying at least one antenna position of the series of other antenna positions having a signal strength higher than the measured current signal strength, and (4) determining that the antenna 210 is mis-pointed based on the existence of at least one antenna position of the series of other antenna positions having a signal strength higher than the measured current signal strength. In an example embodiment, the determination that the antenna 210 is mis-pointed based on the existence of at least one antenna position of the series of other antenna positions having a signal strength higher than the measured current signal strength may require a difference in signal strength above some predetermined threshold, e.g., 0.1 dB, or some other threshold. In an example embodiment, the determination that the antenna 210 is mis-pointed based on the existence of at least one antenna position of the series of other antenna positions having a signal strength higher than the measured current signal strength may be made when any antenna position has any value of a higher signal strength than the measured current signal strength. Accordingly, based on the determination that the antenna 210 is mis-pointed, a device implementing the systems and methods described herein, e.g., one or more components of antenna assembly 104, may select the tilt position (2006) and provide the control signal to tilt the subreflector 204 to the selected tilt position (2008), e.g., when a determination is made that the antenna is mis-pointed as described above.

In an example embodiment, a determination may be made that a predetermined period (e.g., a wait time) has occurred (e.g., also at 2010). Accordingly, based on the determination that the predetermined period (e.g., a wait time) has occurred, selecting the tilt position (2006) and providing the control signal to tilt the subreflector 204 to the selected tilt position (2008) may occur. In other words, after some period of time, which may be recurring, an example embodiment may run a search, e.g., a spiral search, to determine if the antenna 210 is still pointed in the best direction.

In an example embodiment, a determination may be made that a selected tilt position is at a predetermined maximum angle from a neutral tilt position of the subreflector (2012). For example, a determination may be made that a selected tilt position (e.g., of the plurality of tilt positions 1002) is at a predetermined maximum angle 1004, 1008 from a neutral tilt position 1006 of the subreflector 204 (See FIG. 10). In an example embodiment, the determination may be made based on a value of the control signal. Some values of the control signal may be predetermined to be at or near the predetermined maximum angle 1004, 1008. The control signal may be analog or digital. The control signal may comprise separate control signals, each configured to control one of two motors.

When the selected tilt position (e.g., of the plurality of tilt positions 1002) is at a predetermined maximum angle 1004, 1008 from a neutral tilt position 1006 of the subreflector 204, an alert may be transmitted (2014). In an example embodiment, the alert may comprise an audible alert provided to the installer, an alert message to the installation device, a text message to the user's phone, an email alert, an alert to a back-office system, an alert to the a set-top box, or to any other suitable system. The alert may prompt gross tuning of the antenna system, or other corrective action. Alternatively, when a selected tilt position is not at a predetermined maximum angle from a neutral tilt position of the subreflector, an example system may provide the control signal to tilt the subreflector 204 to the selected tilt position (2008), e.g., one of the plurality of tilt positions.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list, solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be appreciated that the particular implementations shown and described herein are illustrative of the invention and its best mode and are not intended to otherwise limit the scope of the present invention in any way. Furthermore, the connecting lines shown in the various figures contained herein are intended to represent exemplary functional relationships and/or physical couplings between the various elements. It should be noted that many alternative or additional functional relationships or physical connections may be present in a practical device.

As one skilled in the art will appreciate, the mechanism of the present invention may be suitably configured in any of several ways. It should be understood that the mechanism described herein with reference to the figures is but one exemplary embodiment of the invention and is not intended to limit the scope of the invention as described above.

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the operations recited in any method claims may be executed in any order and are not limited to the order presented in the claims. Moreover, no element is essential to the practice of the invention unless specifically described herein as "critical" or "essential."

What is claimed is:

1. A method of antenna pointing of an antenna that produces a beam, is disposed on a stationary support pier, and comprises a reflector, a subreflector, and a tilt assembly, the method comprising:

receiving, from an auto-peak device, a control signal to control the tilt assembly to tilt the subreflector in a plurality of tilt positions, relative to the reflector, to move the beam while a corresponding signal strength of a signal communicated via the antenna at each of the plurality of tilt positions is measured; and tilting the subreflector to at least one tilt position of the plurality of tilt positions in response to the control signal, wherein the tilt assembly comprises:

the subreflector;

the reflector;

a base structure connected to a support beam that further connects to the reflector;

a pivot assembly configured to couple the subreflector to the base structure such that the subreflector is configured to pivot in one or more directions about a pivot point at the pivot assembly relative to the base structure;

one or more actuators configured to tilt the subreflector in one or more tilt positions relative to the reflector and to cause the subreflector to pivot about the pivot point; and a counter-force device configured to maintain a force on the subreflector and dampen movement of the subreflector in response to the one or more actuators, wherein the one or more actuators are configured to tilt the subreflector to the one or more tilt positions in response to the control signal.

2. The method of claim 1, wherein the tilt assembly further comprises a spring connected between the base structure and a backside of the subreflector.

3. The method of claim 1, wherein the one or more actuators comprises a first actuator and a second actuator each comprising a motor configured to tilt the subreflector about the pivot point, and wherein tilting the subreflector in response to the control signal causes movement of the motors in the respective first and second actuators.

4. The method of claim 1, further comprising providing a fixed user terminal antenna assembly comprising the antenna and the auto-peak device, wherein the subreflector is coupled to the reflector via a support boom and the reflector is coupled to a support pier by a mounting bracket assembly, wherein the antenna further comprises a feed and a transceiver assembly on the support boom, and wherein the feed is oriented relative to the reflector and the subreflector to produce a beam.

5. The method of claim 1, further comprising:

providing, by the auto-peak device, the control signal to the tilt assembly to tilt the subreflector in the plurality of tilt positions, relative to the reflector, to move the beam while measuring the corresponding signal strength of the signal communicated via the antenna at each of the plurality of tilt positions; and selecting, by the auto-peak device, the control signal to tilt the subreflector to a selected tilt position.

6. The method of claim 5, further comprising transmitting an alert when the selected tilt position is at a predetermined maximum tilt angle from a neutral tilt position of the subreflector.

7. The method of claim 6, wherein the alert provides notification that the subreflector is near a tilt limit of the subreflector and that gross aiming of a terminal antenna assembly may be required.

8. The method of claim 1, further comprising periodically providing the control signal to tilt the subreflector in the plurality of tilt positions and periodically selecting a selected tilt position.

9. The method of claim 8, wherein providing the control signal to tilt the subreflector in the plurality of tilt positions and selecting a selected tilt position is performed to verify an installation of a user terminal antenna assembly.

10. The method of claim 1, further comprising providing the control signal and selecting a selected tilt position when a determination is made that the antenna is mis-pointed.

11. The method of claim 1, wherein moving the beam comprises moving the beam in both elevation and azimuth directions.

12. A steerable subreflector assembly for adjusting an orientation of a subreflector relative to a reflector of an antenna assembly on a stationary support pier to move a user terminal beam of the antenna assembly in response to a control signal, the subreflector assembly comprising:

the subreflector;

a base structure connected to a support beam that further connects to the reflector;

a pivot assembly configured to couple the subreflector to the base structure such that the subreflector is configured to pivot in one or more directions about a pivot point at the pivot assembly relative to the base structure;

one or more actuators configured to tilt the subreflector in a plurality of tilt positions relative to the reflector and to cause the subreflector to pivot about the pivot point; and a counter-force device configured to maintain a force on the subreflector and dampen movement of the subreflector in response to the one or more actuators, wherein the control signal is received from an auto-peak device, and wherein the one or more actuators are configured to tilt the subreflector to one or more of the plurality of tilt positions in response to the control signal.

13. The steerable subreflector assembly of claim 12, wherein the control signal is generated based on measuring corresponding signal strengths of a signal communicated via the antenna assembly at each of the plurality of tilt positions.

14. The steerable subreflector assembly of claim 12, wherein the one or more actuators comprises:

a first actuator connected to the base structure and in contact with a backside of the subreflector at a first point; and a second actuator connected to the base structure and in contact with the backside of the subreflector at a second point, wherein movement of at least one of the first and second actuators tilts the subreflector relative to the base structure and configured to provide both azimuth and elevation movement of the user terminal beam.

15. The steerable subreflector assembly of claim 14, wherein the counter-force device contacts the backside of the subreflector at a third point, wherein the third point is located on a first portion of the backside of the subreflector, and wherein the first and second points are located on a second portion of the backside of the subreflector opposite the first portion.

16. The steerable subreflector assembly of claim 14, wherein the first actuator is in contact with the backside of the subreflector through a point contact, and wherein the second actuator is coupled to the subreflector through a sliding joint.

17. The steerable subreflector assembly of claim 14, wherein the first actuator is connected to the backside of the subreflector through a spherical adapter connection and the second actuator is connected to the backside of the subreflector through a sliding joint connection.

18. The steerable subreflector assembly of claim 12, wherein the counter-force device comprises a spring, a hydraulic piston, a rubber band, or a bungy cord.

19. The steerable subreflector assembly of claim 12, wherein the one or more actuators are connected to a backside of the subreflector through respective kinematic joint connections.

20. The steerable subreflector assembly of claim 12, wherein the one or more actuators each comprise a motor and are configured to tilt the subreflector about the pivot point.

21. The steerable subreflector assembly of claim 12, wherein the one or more actuators are each respectively connected to a backside of the subreflector through a snap-fit connection.

22. The steerable subreflector assembly of claim 12, wherein moving between the plurality of tilt positions is configured to facilitate moving the user terminal beam in both elevation and azimuth directions.

23. The steerable subreflector assembly of claim 12, wherein the auto-peak device is configured to periodically provide the control signal to the steerable subreflector assembly to tilt the subreflector in the plurality of tilt positions and periodically select the tilt position.

24. The steerable subreflector assembly of claim 23, further comprising an alert device configured to transmit an alert, when the selected tilt position is at a predetermined maximum tilt angle from a neutral tilt position of the subreflector.

25. The steerable subreflector assembly of claim 12, wherein a backside of the subreflector comprises three connection points including a first actuator of the one or more actuators, a second actuator of the one or more actuators, and the counter-force device.

26. The steerable subreflector assembly of claim 25, wherein the counter-force device is on an opposite side of a midline of the backside of the reflector from the first and second actuators.

* * * * *